(12) United States Patent
Butcher et al.

(10) Patent No.: US 11,775,465 B2
(45) Date of Patent: Oct. 3, 2023

(54) INTRA-CHASSIS DEVICE MULTI-MANAGEMENT DOMAIN SYSTEM

(71) Applicant: Dell Products L.P., Round Rock, TX (US)

(72) Inventors: Andrew Butcher, Cedar Park, TX (US); Shawn Joel Dube, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 17/492,936

(22) Filed: Oct. 4, 2021

(65) Prior Publication Data
US 2023/0106828 A1 Apr. 6, 2023

(51) Int. Cl.
*G06F 13/40* (2006.01)
*G06F 13/42* (2006.01)
*G06F 21/44* (2013.01)

(52) U.S. Cl.
CPC .......... *G06F 13/405* (2013.01); *G06F 13/4068* (2013.01); *G06F 13/4221* (2013.01); *G06F 21/44* (2013.01); *G06F 2213/0026* (2013.01); *G06F 2221/2141* (2013.01)

(58) Field of Classification Search
CPC ............... G06F 13/405; G06F 13/4068; G06F 13/4221; G06F 21/44; G06F 2213/0026; G06F 2221/2141
See application file for complete search history.

(56) References Cited

U.S. PATENT DOCUMENTS

| | | | | |
|---|---|---|---|---|
| 7,162,560 | B2* | 1/2007 | Taylor et al. ............ | G06F 1/24 710/266 |
| 9,177,271 | B2 | 11/2015 | Thomas | |
| 10,936,191 | B1* | 3/2021 | Lakshminarayanan et al. ........... | G06F 3/067 |
| 2006/0253619 | A1* | 11/2006 | Torudbakken et al. .................... | G06F 13/4022 710/31 |
| 2014/0298079 | A1* | 10/2014 | Dean .................. | G06F 11/2084 714/4.5 |
| 2015/0150013 | A1* | 5/2015 | Chong et al. .......... | G06F 9/468 718/102 |
| 2016/0212027 | A1* | 7/2016 | Brundridge et al. | H04L 41/0813 |
| 2017/0048223 | A1* | 2/2017 | Anantha Padmanaban et al. ....... | H04L 63/0807 |
| 2017/0242605 | A1* | 8/2017 | Suryanarayana et al. .................. | G06F 3/0644 |
| 2020/0007622 | A1* | 1/2020 | Cilfone et al. ....... | H04L 41/042 |
| 2020/0028848 | A1* | 1/2020 | Gupta et al. .......... | G06F 21/105 |
| 2021/0075682 | A1* | 3/2021 | Alcorn et al. .......... | H04L 41/12 |
| 2021/0326221 | A1* | 10/2021 | Guim Bernat et al. ..................... | G06F 11/3058 |

* cited by examiner

*Primary Examiner* — Farley Abad
*Assistant Examiner* — Henry W Yu
(74) *Attorney, Agent, or Firm* — Joseph Mencher

(57) ABSTRACT

An intra-chassis device multi-management domain system includes a chassis housing a host processing system connected to first device(s), a secondary processing system connected to second device(s), and a management system connected to the first and second device(s). The management system may receive a first request for management access including first management domain access credentials, determine that the first management domain access credentials allow first access to a host domain associated with the host processing system and, in response, provide the first access to the first device(s) connected to the host processing system. The management system may also receive a second request for management access that includes second management domain access credentials, determine that the second management domain access credentials allow second access to a secondary domain associated with the secondary processing system and, in response, provide the second access to the second device(s) connected to the secondary processing system.

20 Claims, 21 Drawing Sheets

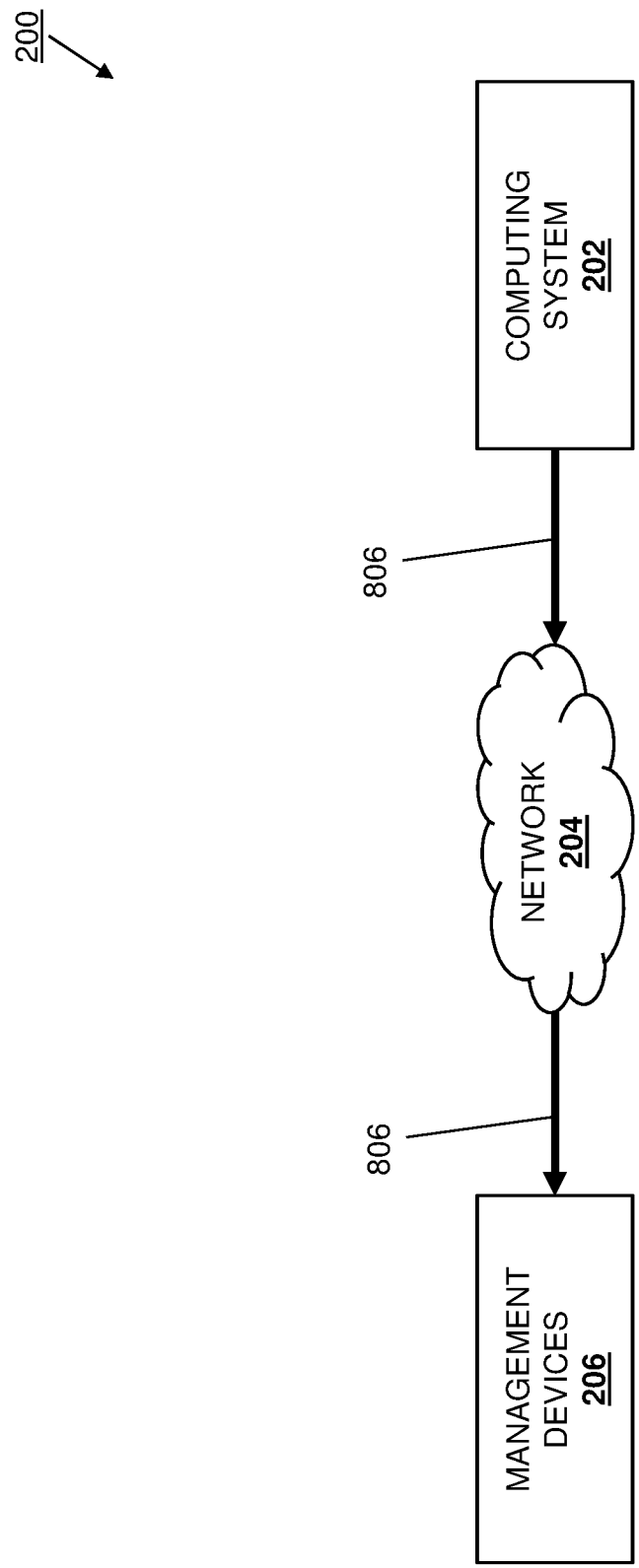

INTRA-CHASSIS DEVICE MULTI-MANAGEMENT DOMAIN SYSTEM

BACKGROUND

The present disclosure relates generally to information handling systems, and more particularly to providing multiple management domains for devices in a chassis of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers and/or other computing systems known in the art, often include devices (e.g., peripheral devices and/or other devices known in the art) that are coupled to the host processing system in that computing system and that require management. As such, many of those computing systems are provided with management systems such as the integrated DELL® Remote Access Controller (iDRAC) available in servers provided by DELL® Inc. of Round Rock, Texas, United States; Baseboard Management Controllers (BMCs); and/or other management systems known in the art that operate to provide a single, monolithic management/administrative domain that allows management access to the devices in the computing system in order to monitor, control, and/or otherwise manage those devices. However, next-generation computing systems may be provided with a secondary processing system that is separate from the host processing system, with each of the host processing system and the secondary processing system connected to different subsets of the devices in the computing system, which can raise some issues with regard to the management of those devices.

For example, such secondary processing systems may be provided in System Control Processors (SCPs) that are included in the computing system but that provide services for the computing system that are separate from the services provided by the host processing system. To provide a specific example, the host processing system in the computing system may provide a variety of conventional server functionality, while the secondary processing system provided with the SCP in the computing system may provide data storage functionality, networking functionality, firewall functionality, and/or other functionality that is considered technically "separate" from the server and thus should be managed separately from the server functionality. However, as discussed above conventional management systems such as the iDRAC or BMC are configured to provide access to all of the devices in the computing system via a single, monolithic management/administrative domain, and thus any administrator (or administration software) accessing the management system will be provided access to devices connected to both the host processing system and the secondary processing system/SCP, which presents the possibility of a host administrator (or host administration software) making changes to device(s) connected to the secondary processing system/SCP that can result in issues with the operation of those device(s), and/or an SCP administrator (or SCP administration software) making changes to device(s) connected to the host processing system that can result in issues with the operation of those device(s).

Accordingly, it would be desirable to provide a device management system that addresses the issues discussed above.

SUMMARY

According to one embodiment, an Information Handling System (IHS) includes a management processing system; and a management memory system that is coupled to the management processing system and that includes instructions that, when executed by the management processing system, cause the management processing system to provide a management engine that is configured to: receive a first request for management access that includes first management domain access credentials; determine that the first management domain access credentials allow first access to a host domain associated with a host processing system and, in response, provide the first access to at least one first device that is connected to the management processing system and the host processing system; receive a second request for management access that includes second management domain access credentials; determine that the second management domain access credentials allow second access to a secondary domain associated with a secondary processing system and, in response, provide the second access to the at least one second device that is connected to the management processing system and the secondary processing system.

BRIEF DESCRIPTION OF THE DRAWINGS

FIG. 8G is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
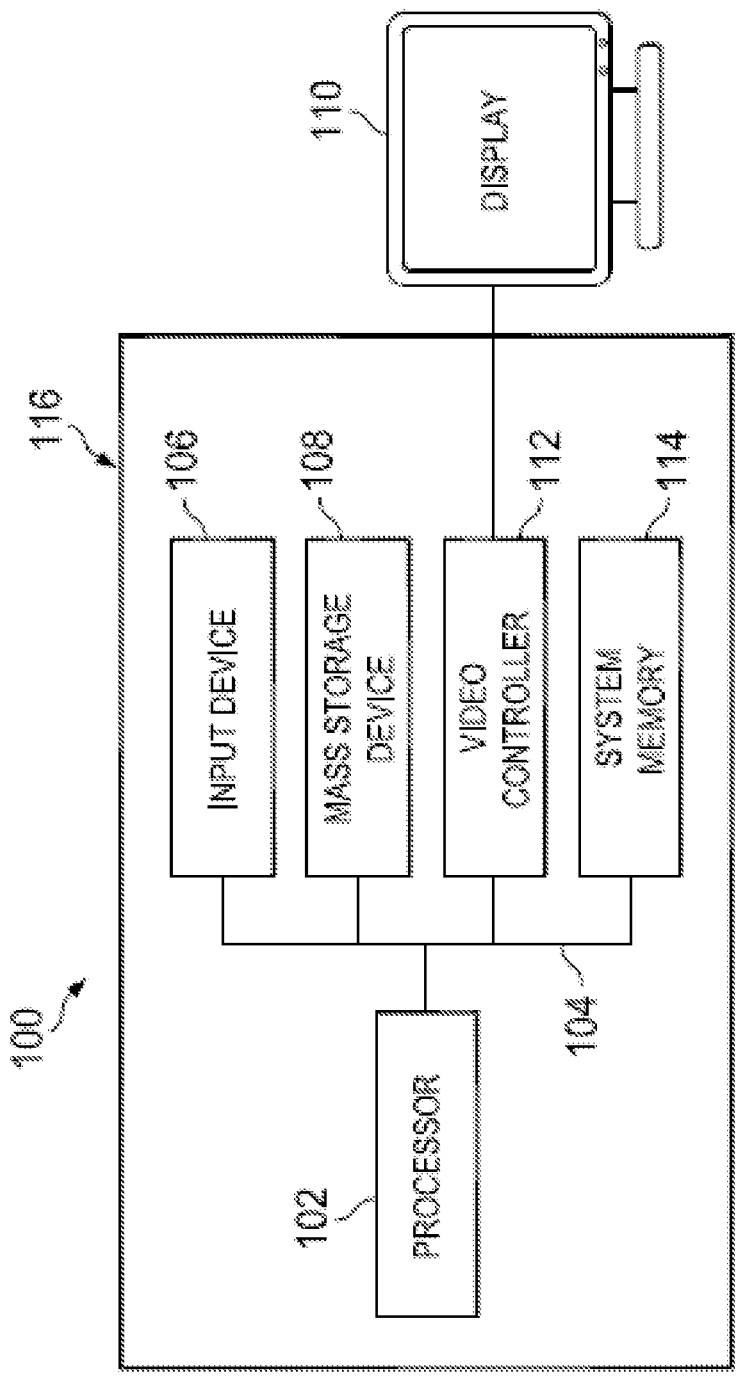
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
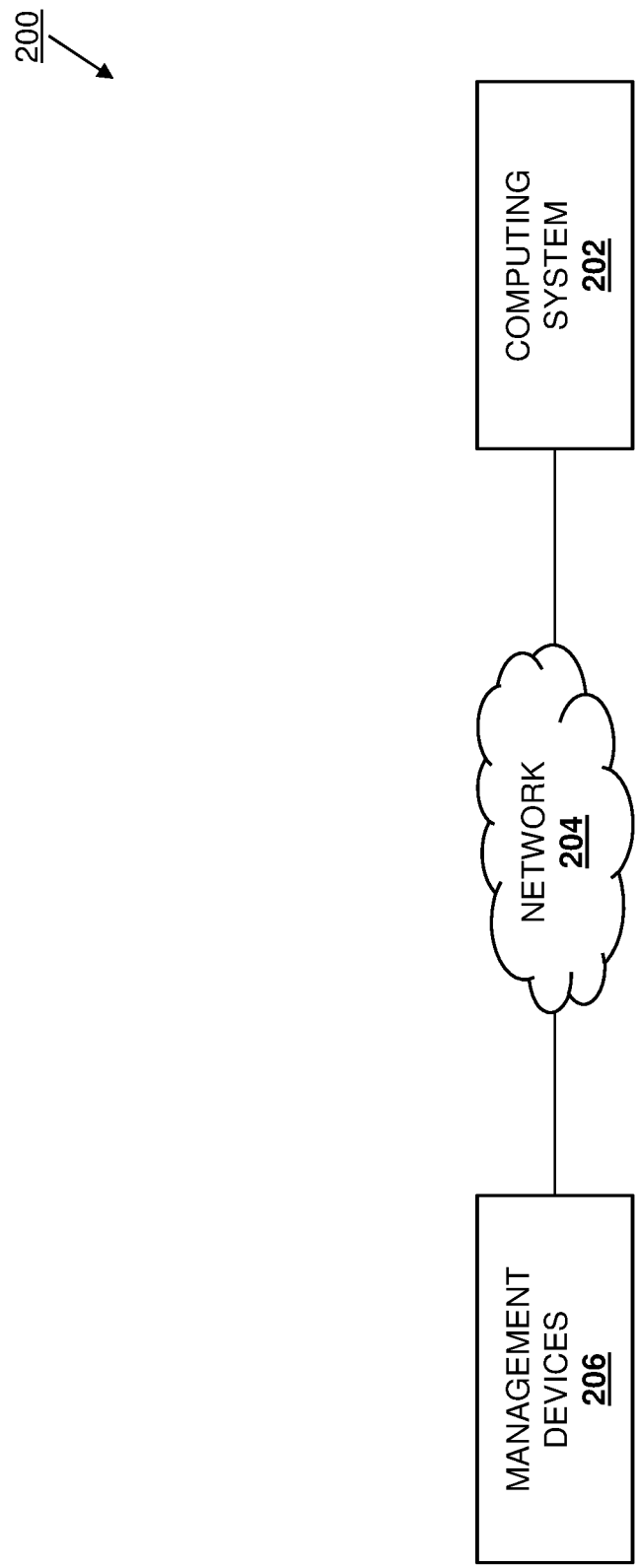
FIG. 2 is a schematic view illustrating an embodiment of a networked system that may include the intra-chassis device multi-management domain system of the present disclosure.

Referring now to FIG. 2, an embodiment of a networked system 200 is illustrated that may include the intra-chassis device multi-management domain system of the present disclosure. In the illustrated embodiment, the networked system 200 includes a computing system 202. In an embodiment, the computing system 202 may be provided by the IHS 100 discussed above with reference to FIG. 1, and/or may include some or all of the components of the IHS 100, and in the specific examples below is described as being provided by a server device. However, while illustrated and discussed as being provided by a server device, one of skill in the art in possession of the present disclosure will recognize that computing systems provided in the networked system 200 may include any computing systems that may be configured to operate similarly as the computing system 202 discussed below. In the illustrated embodiment, the computing system 202 is coupled to a network 204 that may be provided by a Local Area Network (LAN), the Internet, combinations thereof, and/or any other network that would be apparent to one of skill in the art in possession of the present disclosure.

In the illustrated embodiment, management devices 206 are also coupled to the network 204. In an embodiment, any or each of the management devices 206 may be provided by the IHS 100 discussed above with reference to FIG. 1, and/or may include some or all of the components of the IHS 100, and in specific examples may be provided by desktop computing devices, laptop/notebook computing devices, tablet computing devices, mobile phones, and/or other management devices that would be apparent to one of skill in the art in possession of the present disclosure. However, while illustrated and discussed as being provided by specific computing devices, one of skill in the art in possession of the present disclosure will recognize that management devices provided in the networked system 200 may include any management devices that may be configured to operate similarly as the management devices 206 discussed below. Furthermore, while only a single computing system 200 is illustrated, one of skill in the art in possession of the present disclosure will recognize that many more computing systems may (and typically will) be coupled to the management devices 206 via the network 204 (e.g., in a datacenter) while remaining within the scope of the present disclosure. Furthermore, while a specific networked system 200 has been illustrated and described, one of skill in the art in possession of the present disclosure will recognize that the intra-chassis device multi-management domain system of the present disclosure may include a variety of components and component configurations while remaining within the scope of the present disclosure.

Figure 3:
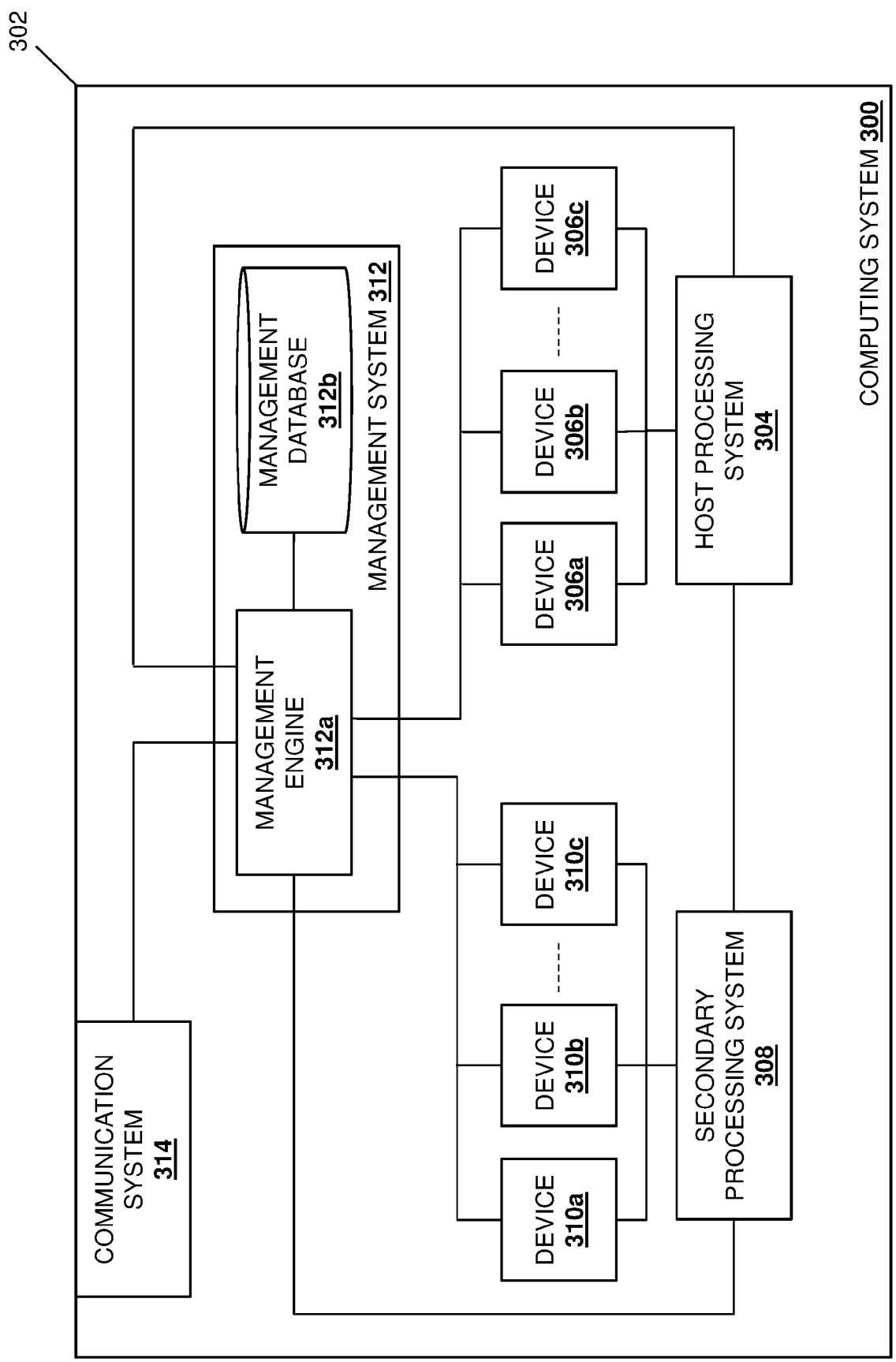
FIG. 3 is a schematic view illustrating an embodiment of a computing system that may be included in the networked system of FIG. 2 and that may provide the intra-chassis device multi-management domain system of the present disclosure.

Referring now to FIG. 3, an embodiment of a computing system 300 is illustrated that may provide the computing system 202 discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other devices that are configured to operate similarly as the computing system 300 discussed below. In the illustrated embodiment, the computing system 300 includes a chassis 302 that houses the components of the computing system 300, only some of which are illustrated and discussed below.

In the illustrated example, the chassis 302 houses a host processing system 304 (e.g., the processor 102 discussed above with reference to FIG. 1, which may be provided by a Central Processing Unit (CPU) and/or other host processing systems known in the art) and a host memory system (not illustrated, but which may include the memory 114 discussed above with reference to FIG. 1) that is coupled to the host processing system 304 and that includes instructions that, when executed by the host processing system 304, cause the host processing system 304 to perform a variety of host processing functionality (e.g., providing an operating system, applications, and/or other server functionality that would be apparent to one of skill in the art in possession of the present disclosure). The chassis 302 may also house or be coupled to a plurality of devices 306a, 306b, and up to 306c that are each coupled to the host processing system 304. In a specific example, the devices 306a-306c may be provided by peripheral devices that may be connected to a root complex included in the host processing system 304 via Peripheral Component Interconnect express (PCIe) connections, although one of skill in the art in possession of the present disclosure will appreciate how other types of devices may be coupled to the host processing system via other types of connections while remaining within the scope of the present disclosure as well.

In the illustrated example, the chassis 302 also houses a secondary processing system 308 (e.g., which may be provided by a microcontroller in the System Control Processor (SCP) discussed below, or by other secondary processing systems known in the art) and a secondary memory system (not illustrated, but which may include the memory 114 discussed above with reference to FIG. 1) that is coupled to the secondary processing system 308 and that includes instructions that, when executed by the secondary processing system 308, cause the secondary processing system 308 to perform a variety of secondary processing functionality (e.g., providing an the SCP functionality discussed below, as well as other secondary functionality that would be apparent to one of skill in the art in possession of the present disclosure). As illustrated, the secondary processing system 308 may be coupled to the host processing system 304 via a PCIe connection and/or other processing system couplings known in the art. In specific examples in which the secondary processing system 308 is provided in an SCP, the SCP functionality may provide an SCP Manager (SCPM) that one of skill in the art in possession of the present disclosure will appreciate is relatively higher-level software associated with the SCP that requires relatively higher-level access privileges. For example, the SCPM discussed above may be provided by a remote subsystem or other entity (e.g., one of the management devices 206 discussed above that is coupled to the computing system 202/300 via the network 204) and may be configured to access the devices coupled to the secondary processing system 308 (e.g., the devices 310a-310c in FIG. 3) via a network port provided in the communication system 314.

The chassis 302 may also house or be coupled to a plurality of devices 310a, 310b, and up to 310c that are different than the devices 306a-306c and that are each coupled to the secondary processing system 308. In a specific example, the devices 310a-310c may be provided by peripheral devices that may be connected to a root complex included in the secondary processing system 308 via PCIe connections, although one of skill in the art in possession of the present disclosure will appreciate how other types of devices may be coupled to the secondary processing system via other types of connections while remaining within the scope of the present disclosure as well. As such, the host processing system 304 may be coupled to the devices 306a-306c that are not accessible to the secondary processing system 308, and the secondary processing system 308 may be coupled to the devices 310a-310c that are not accessible to the host processing system 304.

As discussed above, in specific examples the secondary processing system 308 may be provided as part of an SCP that is included in the chassis 302. In some examples, the SCP described herein may be conceptualized as an "enhanced" SmartNIC device that may be configured to perform functionality that is not available in conventional SmartNIC devices such as, for example, data storage functionality, networking functionality, firewall functionality, and/or other functionality that may be considered technically "separate" from the host processing functionality performed by the host processing system 304 and, as such, that should be managed separately from that host processing functionality. However, while the secondary processing functionality of the present disclosure is illustrated and described as SCP functionality performed by an enhanced SmartNIC device provided by an SCP subsystem, one of skill in the art in possession of the present disclosure will appreciated that the intra-chassis device multi-management domain functionality described herein may be provided in computing systems utilizing other types of secondary processing systems providing other secondary processing functionality while remaining within the scope of the present disclosure as well.

In an embodiment, the SCP that includes the secondary processing system 308 in the chassis 302 may be provided by the IHS 100 discussed above with reference to FIG. 1 and/or may include some or all of the components of the IHS 100. In specific examples, the SCP may be provided as an SCP card that is configured to connect to a slot on a motherboard in the chassis 302. In other examples, the SCP that includes the secondary processing system 308 in the chassis 302 may be integrated into a motherboard in the chassis 302. In yet other examples the SCP that includes the secondary processing system 308 in the chassis 302 may be a separate/co-motherboard circuit board that is connected to a motherboard in the chassis 302 (e.g., a two-part motherboard having a first portion that enables conventional motherboard functionality, and a second portion that enables the SCP functionality discussed below). In a specific example, the SCP that includes the secondary processing system 308 in the chassis 302 may be referred to as a Data Processing Unit (DPU) that may be provided by a PCIe card including Advanced Reduced Instruction Set Computing (RISC) Machine (ARM) core(s) and a network interface. However, while a few specific examples are provided, one of skill in the art in possession of the present disclosure will appreciate that the SCP that includes the secondary processing system 308 in the chassis 302 may be provided in the computing system 300 in a variety of manners that will fall within the scope of the present disclosure.

In the illustrated example, the chassis 302 also houses a management system 312. In an embodiment, the management system 312 may be provided by the iDRAC discussed above, a BMC, and/or other management systems that would be apparent to one of skill in the art in possession of the present disclosure. For example, the management system 312 may include a management processing system (not illustrated, but which may be provided by the processor 102 discussed above with reference to FIG. 1) and a management memory system (not illustrated, but which may include the memory 114 discussed above with reference to FIG. 1) that is coupled to the management processing system and that includes instructions that, when executed by the management processing system, cause the management processing system to provide a management engine 312a that is configured to perform the functionality of the management engines, management subsystems, and/or management systems discussed below.

The management system 312 may also include a management storage system (not illustrated, but which may include the storage 108 discussed above with reference to FIG. 1) that is coupled to the management engine 304 (e.g., via a coupling between the management storage system and the management processing system) and that includes a management database 312b that is configured to store any of the information utilized by the management engine 304 discussed below. As illustrated, the management engine 312a in the management system 312 is coupled to each of the plurality of devices 306a-306c that are also coupled to the host processing system 304, each of the plurality of devices 310a-310c that are also coupled to the secondary processing system 308, the host processing system 304, and the secondary processing system 308. In a specific example, each of the devices 306a-306c and the devices 310a-310c may be connected to a root complex included in the management processing system that provides the management engine 312a via System Management Bus (SMBus) connections and/or other out-of-band management connections that would be apparent to one of skill in the art in possession of the present disclosure, although one of skill in the art in possession of the present disclosure will appreciate how devices may be coupled to the management engine 312a via other types of connections while remaining within the scope of the present disclosure as well.

As discussed above, conventional management systems would be configured to provide access to all of the devices 306a-306c and 310a-310c in the computing system 300 via a single, monolithic management/administrative domain, and thus any administrator (or administration software) accessing those conventional management systems would be provided access to both the devices 306a-306c connected to both the host processing system 304 and the devices 310a-310c connected to the SCP/secondary processing system 308, which presents the possibility of a host administrator (or host administration software) making changes to the device(s) 310a-310c connected to the secondary processing system 308 (e.g., firmware changes) that can result in issues with the operation of those device(s) 310a-310c, and/or an SCP administrator (or SCP administration software) making changes to device(s) 306a-306c connected to the host processing system 304 (e.g., firmware changes) that can result in issues with the operation of those device(s) 306a-306c. While providing the SCP/secondary processing system 308 management access to the devices 310a-310c and eliminating management access by the management system 312 to those devices 310a-310c could address some of these problems, one of skill in the art in possession of the present disclosure will recognize that management systems like the iDRAC and BMC discussed above perform management operations that would not be performed by an SCP/secondary processing system, and thus eliminating management access to the management system 312 would present new issues.

The chassis 302 may also house a communication system 314 that is coupled to the management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. Furthermore, while not illustrated or described in detail, one of skill in the art in possession of the present disclosure will appreciate how the host processing system 304 and/or the secondary processing system 308 may be coupled to the communication system 314 as well. However, while a specific computing system 300 has been illustrated and described, one of skill in the art in possession of the present disclosure will recognize that computing systems (or other systems operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, while the examples provided herein include only two processing systems (i.e., the host processing system 304 and the secondary processing system 308), one of skill in the art in possession of the present disclosure will appreciate that additional processing systems may be provided in the chassis 302 and connected to devices that are also connected to the management system 312 while remaining within the scope of the present disclosure as well.

Figure 4:
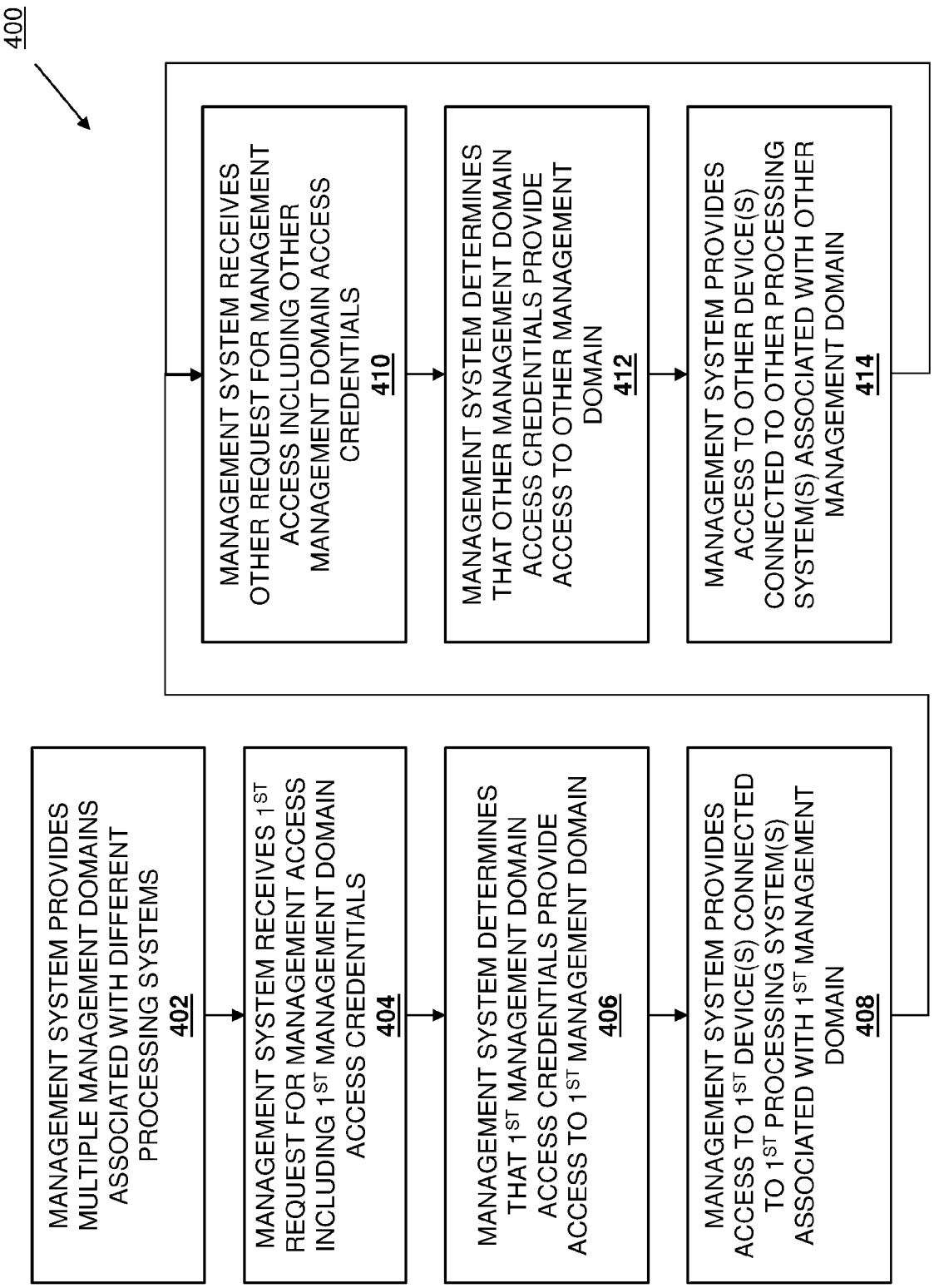
FIG. 4 is a flow chart illustrating an embodiment of a method for managing devices in a chassis via multiple management domains.

Referring now to FIG. 4, an embodiment of a method 400 for managing devices in a chassis via multiple management domains is illustrated. As discussed below, the systems and methods of the present disclosure provide different management domains for respective different processing systems in a chassis, which may be utilized to restrict access to devices connected to those different processing systems based on the management domain access credentials provided for management access. For example, the intra-chassis device multi-management domain system of the present disclosure may include a chassis housing a host processing system connected to first device(s), a secondary processing system connected to second device(s), and a management system connected to the first and second device(s). The management system may receive a first request for management access including first management domain access credentials, determine that the first management domain access credentials allow first access to a host domain associated with the host processing system and, in response, provide the first access to the first device(s) connected to the host processing system. The management system may also receive a second request for management access that includes second management domain access credentials, determine that the second management domain access credentials allow second access to a secondary domain associated with the secondary processing system and, in response, provide the second access to the second device(s) connected to the secondary processing system. As such, changes may only be made to devices connected to a particular processing system in a chassis if management domain access credentials are provided that allow access to the management domain associated with that processing system.

Figure 5:
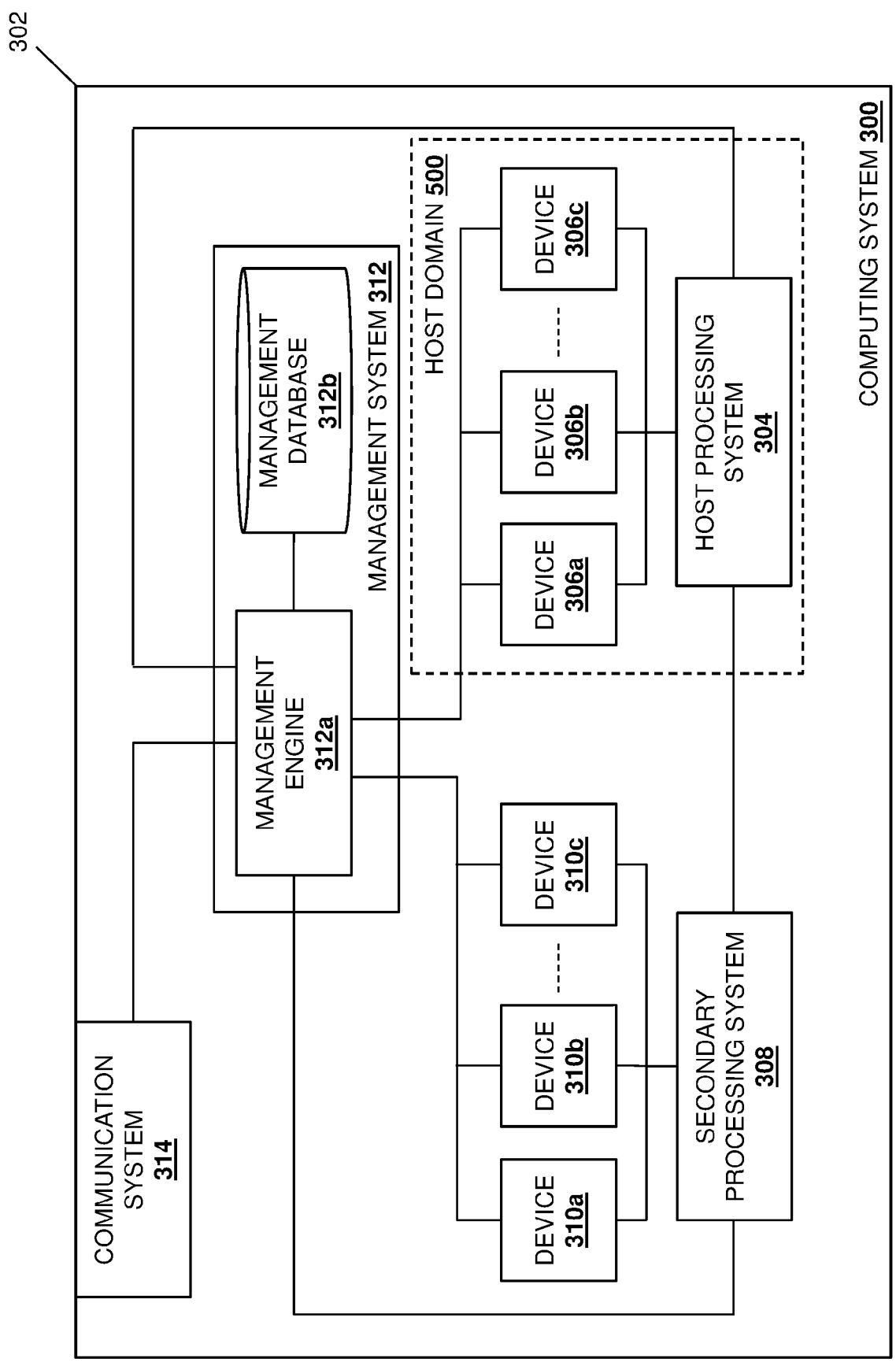
FIG. 5 is a schematic view illustrating an embodiment of the computing system of FIG. 3 operating during the method of FIG. 4.
Figure 6:
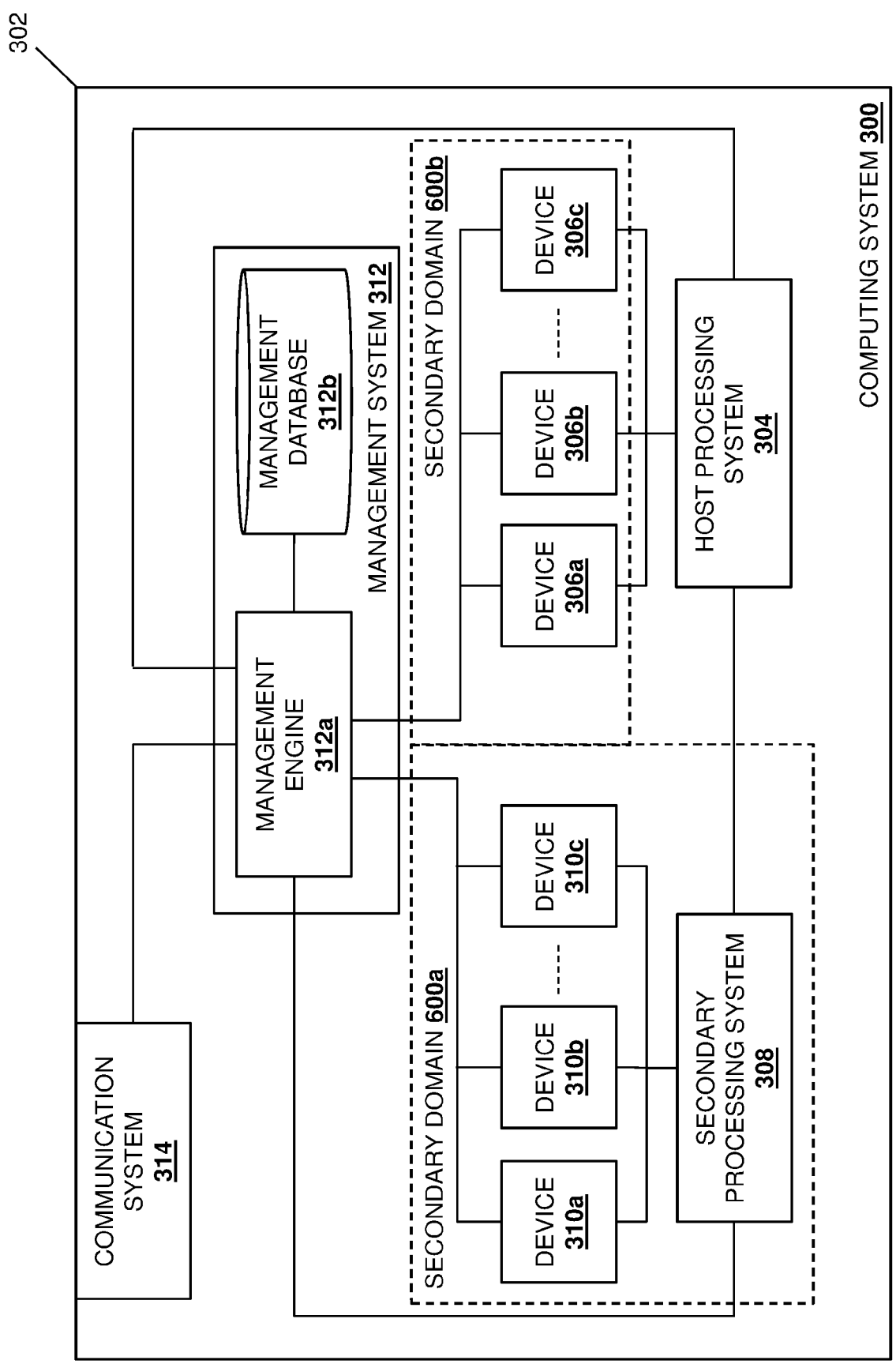
FIG. 6 is a schematic view illustrating an embodiment of the computing system of FIG. 3 operating during the method of FIG. 4.

The method 400 begins at block 402 where a management system provides multiple management domains associated with different processing systems. With reference to FIGS. 5 and 6, in an embodiment of block 402, the management system 312 may provide different management/administration domains (hereinafter "management domains") associated with the host processing system 304 and the secondary processing system 308. For example, FIG. 5 illustrates how the management engine 312a in the management system 312 may provide a host domain 500 associated with the host processing system 304 that, as discussed in the specific examples below, may be configured to allow read/write access to the devices 306a-306c connected to the host processing system 304. Similarly, FIG. 6 illustrates how the management engine 312a in the management system 312 may provide a secondary domain 600a and 600b associated the secondary processing system 308 that, as discussed in the specific examples below, may be configured to allow read/write access to the devices 310a-310c connected to the secondary processing system 308 (e.g., via the secondary domain 600a), and read-only access to the devices 306a-306c connected to the host processing system 304 (e.g., via the secondary domain 600b). However, while specific access functionality (e.g., read/write and read-only in this example) is described, one of skill in the art in possession of the present disclosure will appreciate how the management access provided by host domain 500 and the secondary domain 600a and 600b may include any number of access levels and any of a variety of access types while remaining within the scope of the present disclosure as well.

As described in the examples below, the host domain 500 and secondary domain 600a and 600b may be provided by associating those management domains with their access levels and processing systems in the management database 312b, associating those management domains with management access credentials in the management database 312b, and/or performing any of variety of management domain provisioning operations that one of skill in the art in possession of the present disclosure would recognize as allowing for the functionality described below. Furthermore, while only two management domains for two respective processing systems are illustrated and described herein, as discussed above additional processing systems may be included in the chassis 302 and connected to device(s), and each of those additional processing systems may be associated with a respective management domain (or a plurality of those processing systems may be associated with a common management domain) similarly as described above for the host processing system 304 and the secondary processing system 308 while remaining within the scope of the present disclosure as well.

Figure 7A:
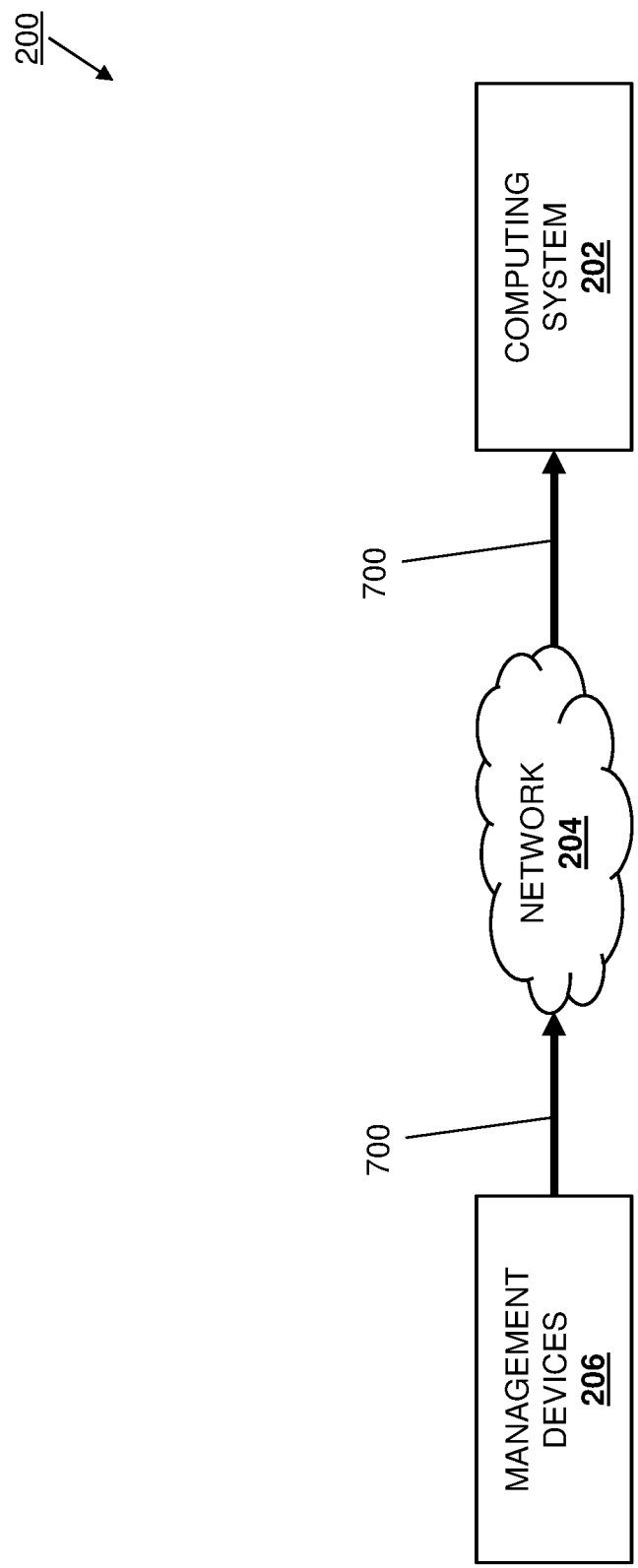
FIG. 7A is a schematic view illustrating an embodiment of the networked system of FIG. 2 operating during the method of FIG. 4.
Figure 7B:
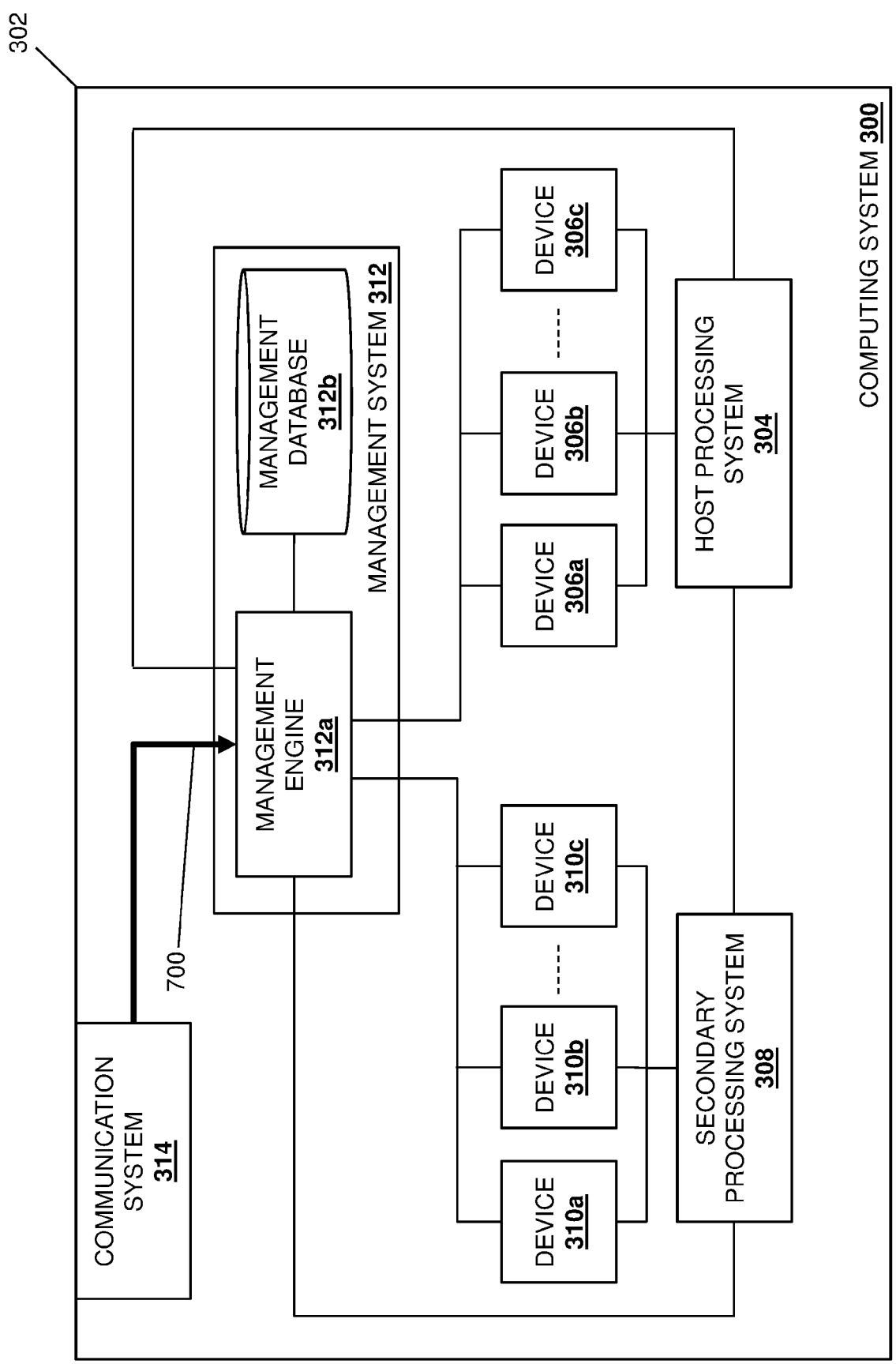
FIG. 7B is a schematic view illustrating an embodiment of the computing system of FIG. 3 operating during the method of FIG. 4.

The method 400 then proceeds to block 404 where the management system receives a first request for management access including first management domain access credentials. With reference to FIGS. 7A and 7B, in an embodiment of block 404, one of the management devices 206 may perform management access request operations 700 that may include transmitting a request for management access via the network 204 and to the computing system 202/300 such that the management engine 312a in the management system 312 receives that request via the communication system 314. In some examples, the management request operations 700 may be initiated/conducted by a user or other network administrator of the networked system 200 via the provisioning of the first management domain access credentials via a management application (e.g., a management Graphical User Interface (GUI)) provided by the management device 206. However, in other examples, the management request operations 700 may be initiated/conducted by a management application (e.g., autonomous or semi-autonomous management software) that is provided by the management device 206 and configured to manage the host processing functionality in computing systems included in the networked system 200. In yet another embodiment, the management device 206 may communicate directly with the host processing system 304 for access to its devices 306a-via a communication path that may be enabled by the management system 312 (e.g., through communication with the secondary processing system 308 or host processing system 304 to proxy commands, enabling the devices to allow the communication paths to their respective processing systems, and/or via other direct communication techniques that would be apparent to one of skill in the art in possession of the present disclosure).

As such, in some examples the management domain access credentials included in the request for management access transmitted at block 404 may include a username and password. However, one of skill in the art in possession of the present disclosure will appreciate how management domain access credentials may be provided by any type of credential information (e.g., a simple identifier, additional authentication information such as two-factor authentication information, etc.) while remaining within the scope of the present disclosure as well. In the examples provided below, the management domain access credentials provided in the request transmitted as part of the management access request operations 700 are configured to provide access to the host domain 500 that is associated with the host processing system 304, and thus one of skill in the art in possession of the present disclosure will appreciate how those management domain access credentials may have been previously provided to the user of the management device 206 that transmits the request for management access at block 404, or previously provided in a management application that manages the host processing functionality in the computing systems included in the networked system 200, as well as stored in the management database 312b in associated with the host domain 500, prior to block 404.

Figure 7C:
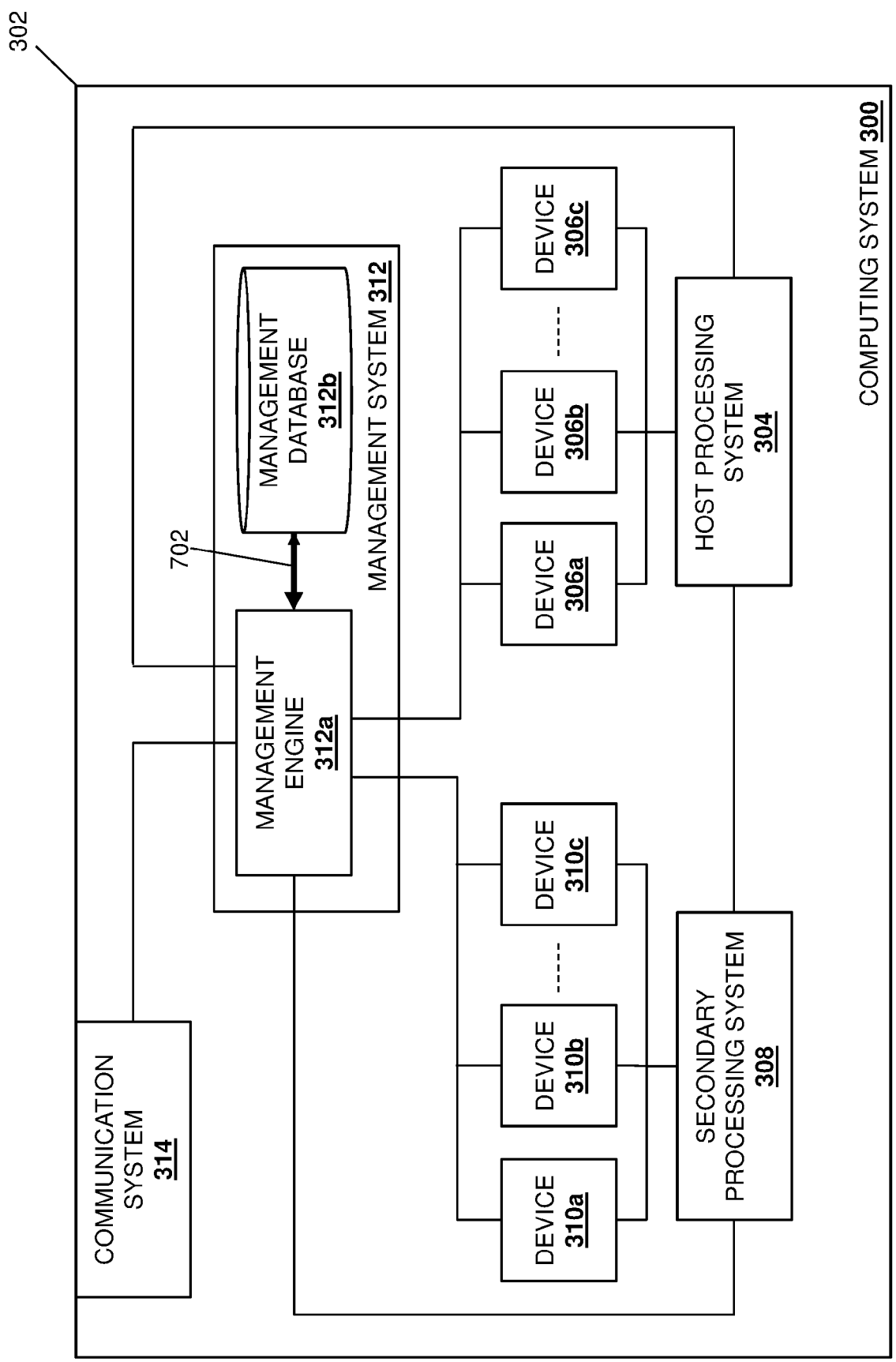
FIG. 7C is a schematic view illustrating an embodiment of the computing system of FIG. 3 operating during the method of FIG. 4.

The method 400 then proceeds to block 406 where the management system determines that the first management domain access credentials provide access to a first management domain. With reference to FIG. 7C, in an embodiment of block 406, the management engine 312*a* in the management system 312 of the computing system 300 may perform management domain access credential authentication operations 702 that include accessing the management database 312*b*, authenticating the management domain access credentials received at block 404 using information in the management database 312*b* and, in the event those management domain access credentials are authenticated, determining a management domain that is associated with those management domain access credentials in the management database 312*b*, as well as performing any other management domain access credential operations that would be apparent to one of skill in the art in possession of the present disclosure. As such, continuing with the example provided above, at block 406 the management engine 312*a* in the management system 312 may access the management database 312*b*, authenticate the management domain access credentials received at block 404 using information in the management database 312*b* and, in response, determine that the host domain 500 is associated with those management domain access credentials in the management database 312*b*. Furthermore, one of skill in the art in possession of the present disclosure will appreciate how management access may be denied if the management domain access credentials received at block 404 are not authenticated at block 406.

Figure 7D:
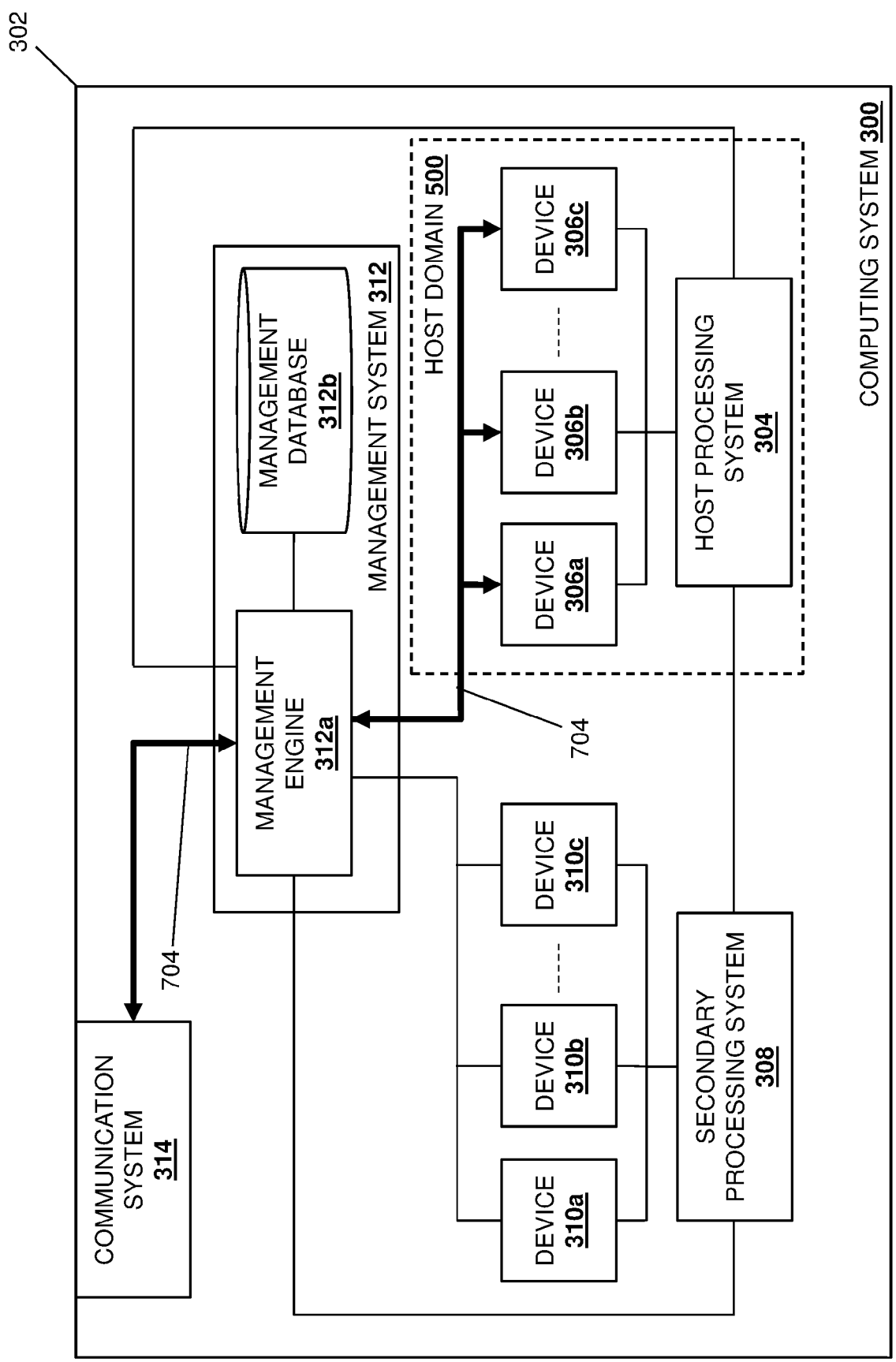
FIG. 7D is a schematic view illustrating an embodiment of the computing system of FIG. 3 operating during the method of FIG. 4.

The method 400 then proceeds to block 408 where the management system provides access to first devices connected to first processing system(s) associated with the first management domain. With reference to FIG. 7D, in an embodiment of block 408 and in response to determining at block 406 that the management domain access credentials received at block 404 have been authenticated and are associated with the host domain 500, the management engine 312*a* in the management system 312 may provide the access associated with the host domain 500 to the devices 306*a*-306*c* that are connected to the host processing system 304. As such, continuing with the example provided above, at block 408 the management engine 312*a* in the management system 312 may provide the management device 206 that transmitted the request for management access at block 404 the read/write access associated with the host domain 500 to the devices 306*a*-306*c* that are connected to the host processing system 304. In a specific example, the access associated with the host domain 500 and provided to the management device 206 that transmitted the request for management access at block 404 may only allow that management device 206 to "see" the devices 306*a*-306*c*, and may "hide" the devices 310*a*-310*c* (e.g., a management GUI provided on the management device 206 that has access to the host domain 500 may only display icons or other indicators for the devices 306*a*-306*c*, while not displaying any indication that the devices 310*a*-310*c* exist in the computing system 300). However, while a specific example is provided, one of skill in the art in possession of the present disclosure will appreciate that the access associated with the host domain 500 may be provided in a variety of manners that will fall within the scope of the present disclosure as well.

Figure 7E:
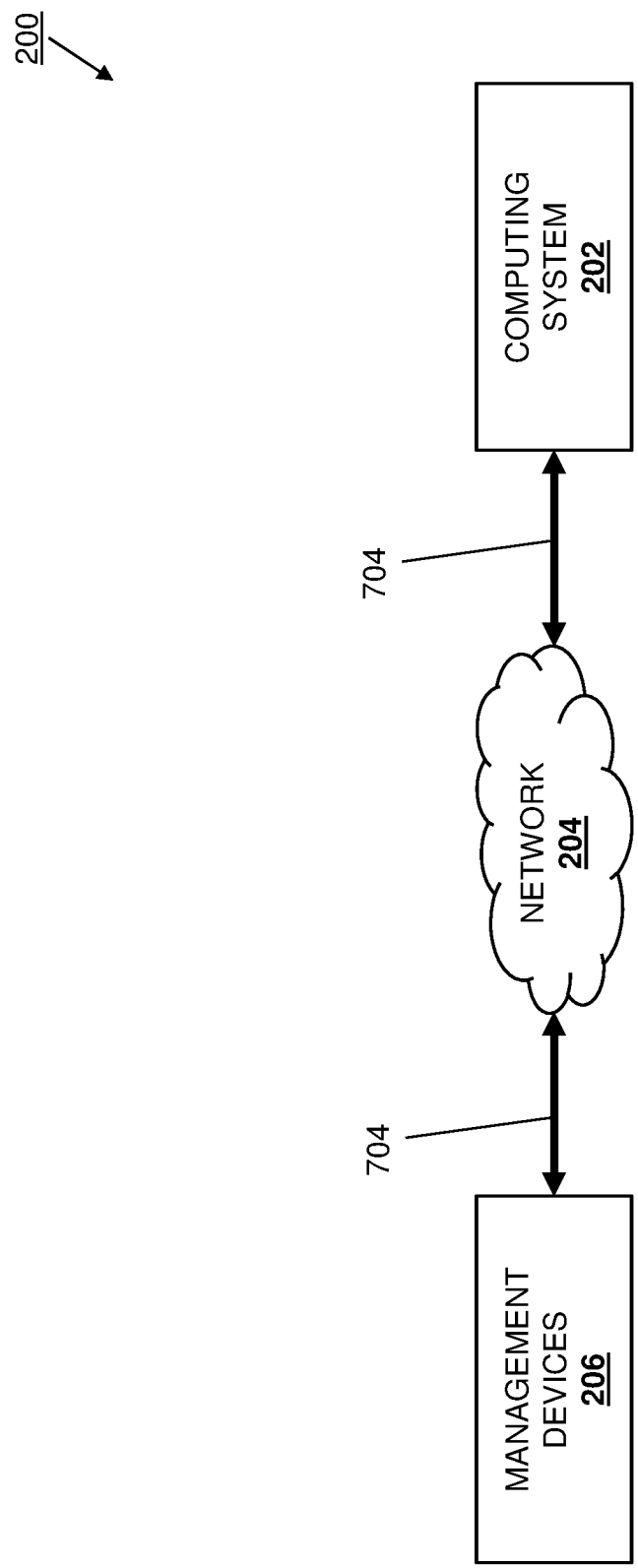
FIG. 7E is a schematic view illustrating an embodiment of the networked system of FIG. 2 operating during the method of FIG. 4.

Thus, as illustrated in FIGS. 7D and 7E, at block 408 the management device 206 that provided the request for management access at block 404 may perform management operations 704 that may include reading information from any of the devices 306*a*-306*b* via the network 204, the communication system 314 in the computing system 202/300, and the management system 312*a* (e.g., via the SMBus or other out-of-band management connection to the devices 306*a*-306*c* in the examples provided above), and/or writing information to any of the devices 306*a*-306*b* via the network 204, the communication system 314 in the computing system 202/300, and the management system 312*a* (e.g., via the SMBus or other out-of-band management connection to the devices 306*a*-306*c* in the examples provided above). As will be appreciated by one of skill in the art in possession of the present disclosure, read/write management operations 704 on the devices 306*a*-306*c* connected to the host processing system 304 may include performing firmware updates for the devices 306*a*-306*c*, installing of operating systems, device drivers, and other software, and/or any other read/write management operations that would be apparent to one of skill in the art in possession of the present disclosure.

Figure 8A:
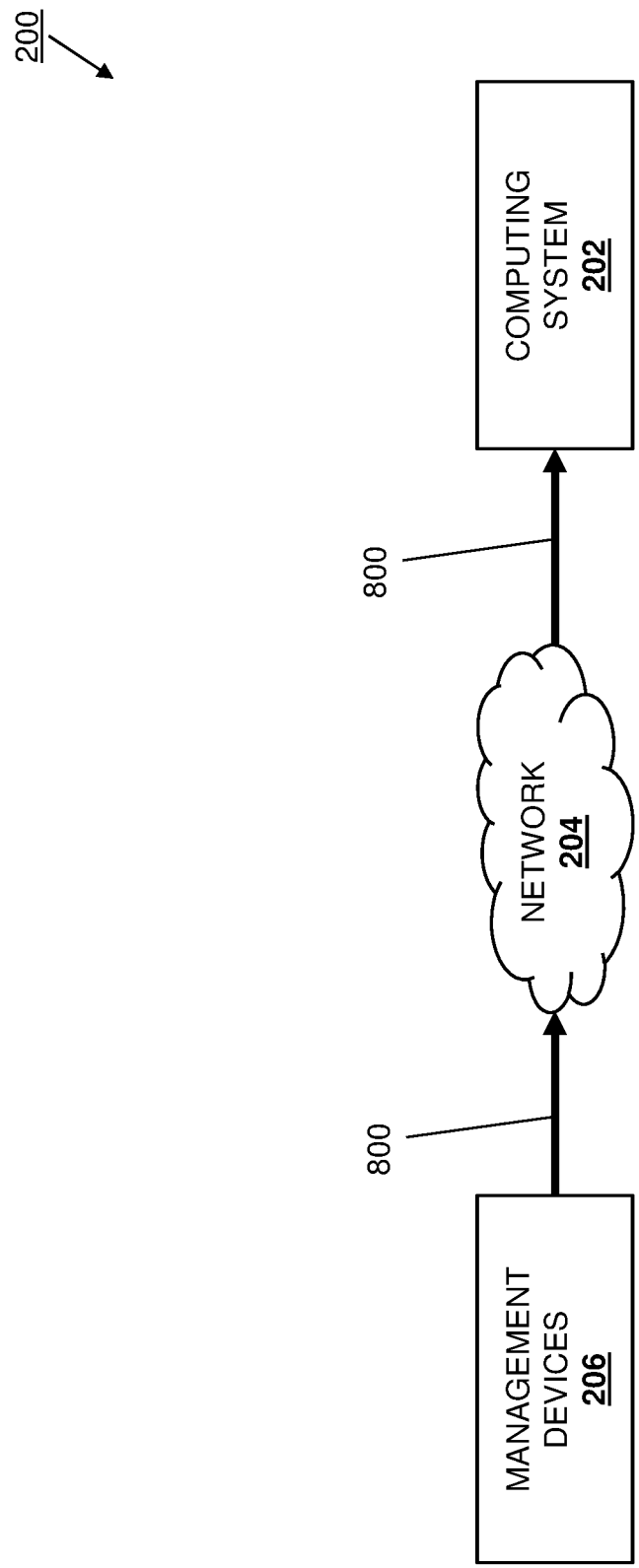
FIG. 8A is a schematic view illustrating an embodiment of the networked system of FIG. 2 operating during the method of FIG. 4.
Figure 8B:
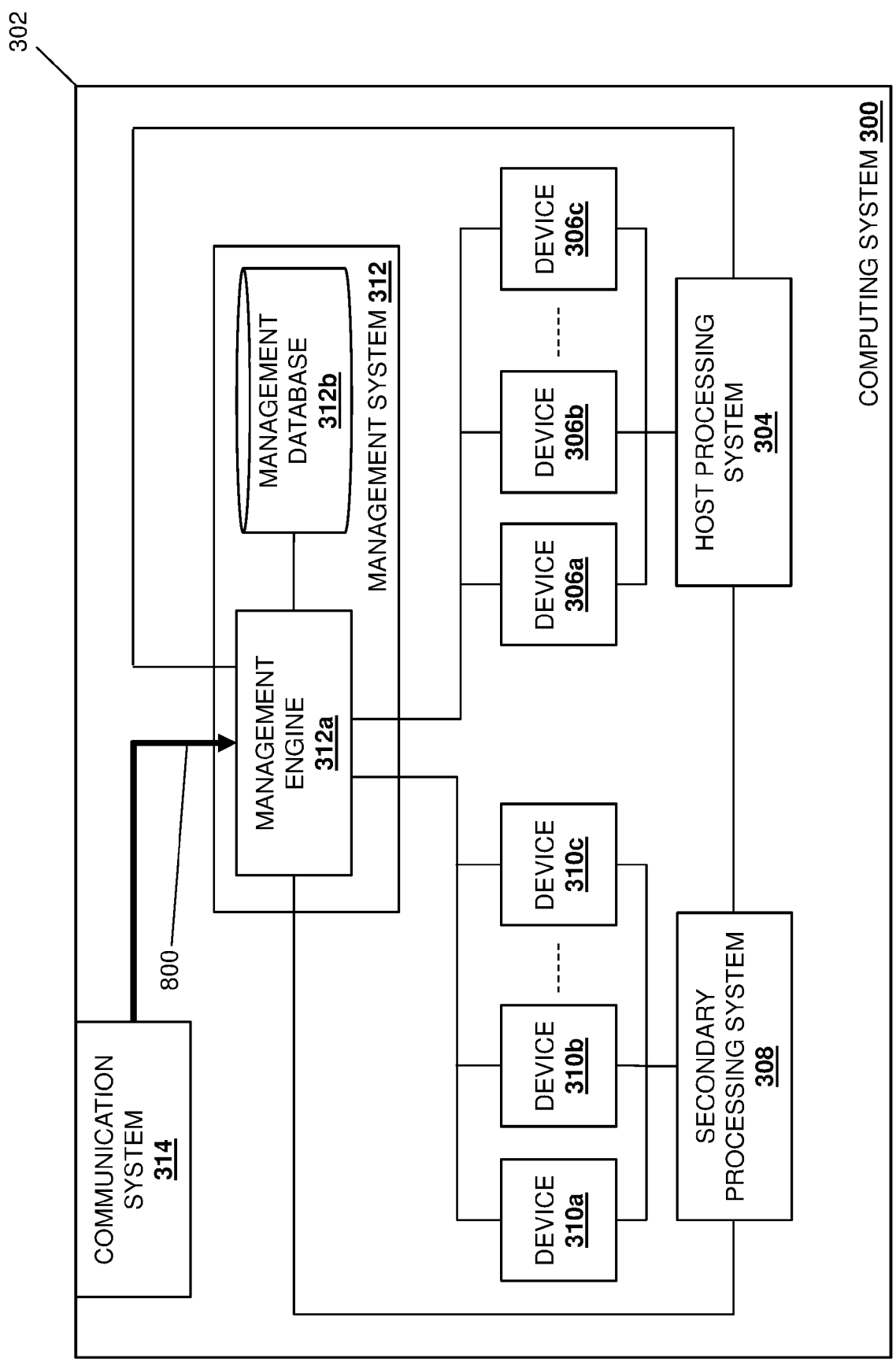
FIG. 8B is a schematic view illustrating an embodiment of the computing system of FIG. 3 operating during the method of FIG. 4.

The method 400 then proceeds to block 410 where the management system receives an other request for management access including other management domain access credentials. With reference to FIGS. 8A and 8B, in an embodiment of block 410, one of the management devices 206 may perform management access request operations 800 that may include transmitting a request for management access via the network 204 and to the computing system 202/300 such that the management engine 312*a* in the management system 312 receives that request via the communication system 314. Similarly as discussed above, the management access request operations 800 may be initiated/conducted by a user or other network administrator of the networked system 200 via the provisioning of the second management domain access credentials via a management application (e.g., a management GUI) provided by the management device 206. However, in other examples, the management access request operations 800 may be initiated/conducted by a management application (e.g., autonomous or semi-autonomous management software) that is provided by the management device 206 and configured to manage the secondary processing functionality (e.g., the SCP functionality in the examples provided above) in computing systems included in the networked system 200. In yet another embodiment, the management device 206 may communicate directly with the host processing system 304 for access to its devices 306*a*-306*c* and/or the secondary processing system 308 for access to its devices 310*a* via communication paths that may be enabled by the management system 312 (e.g., through communication with the secondary processing system 308 or host processing system 304 to proxy commands, enabling the devices to allow the communication paths to their respective processing systems, and/or via other direct communication techniques that would be apparent to one of skill in the art in possession of the present disclosure).

Similarly as discussed above, the management domain access credentials included in the request for management access transmitted at block 410 may include a username and password, but one of skill in the art in possession of the present disclosure will appreciate how management domain access credentials may be provided by other information (e.g., a simple identifier, additional authentication information such as two-factor authentication information, etc.) while remaining within the scope of the present disclosure. In the examples provided below, the management domain access credentials provided in the request transmitted as part of the management access request operations 800 are configured to provide access to the secondary domain 600*a* and 600*b* that is associated with the secondary processing system 308, and thus one of skill in the art in possession of the present disclosure will apricate how those management domain access credentials may have been previously provided to the user of the management device 206a that transmits the request for management access at block 410, or previously provided in a management application that manages the secondary processing functionality in the computing systems included in the networked system 200, as well as stored in the management data 312b in associated with the secondary domain 600a and 600b, prior to block 410.

Figure 8C:
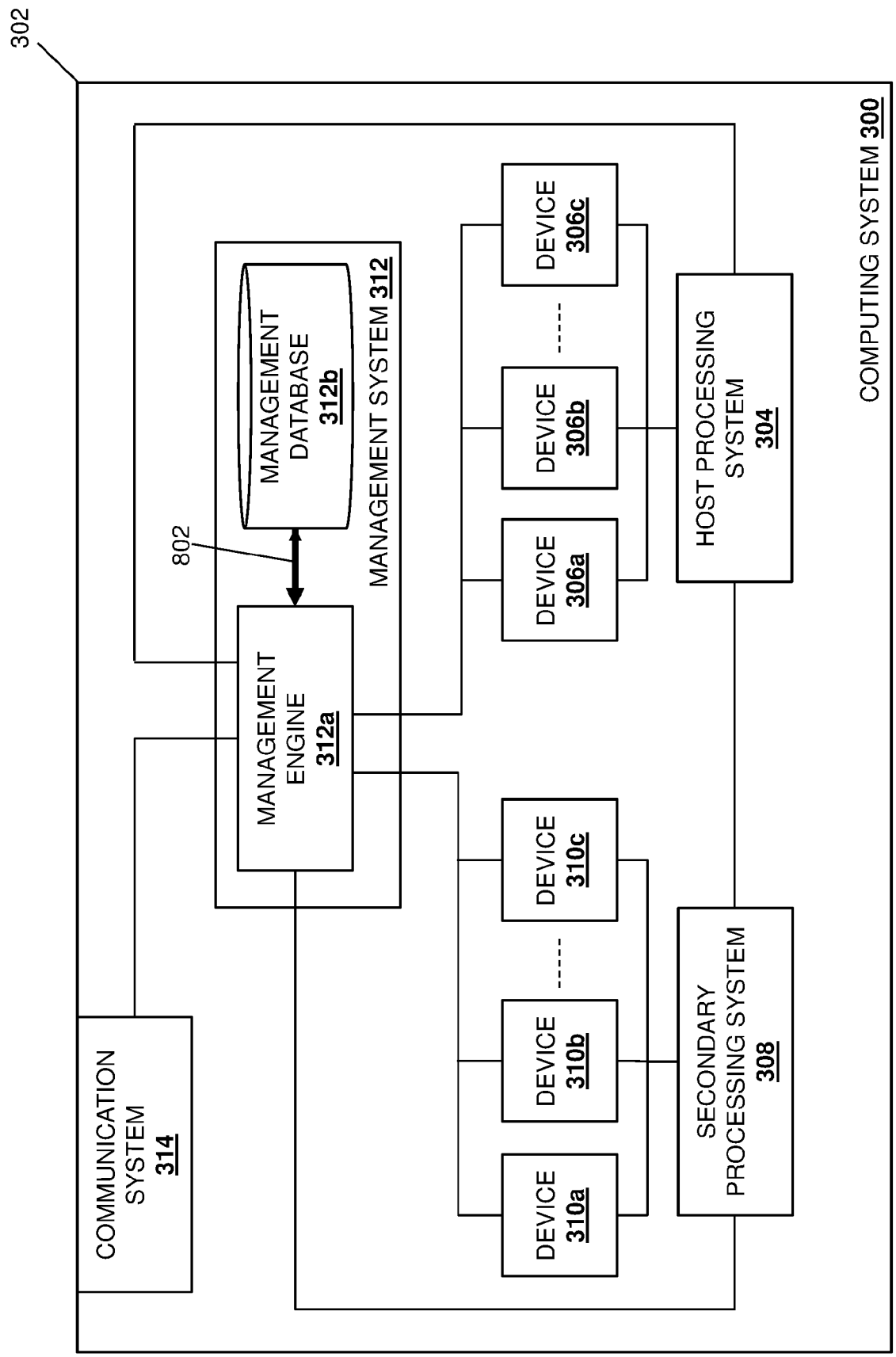
FIG. 8C is a schematic view illustrating an embodiment of the computing system of FIG. 3 operating during the method of FIG. 4.

The method 400 then proceeds to block 412 where the management system determines that the other management domain access credentials provide access to an other management domain. With reference to FIG. 8C, in an embodiment of block 412, the management engine 312a in the management system 312 of the computing system 300 may perform management domain access credential authentication operations 802 that include accessing the management database 312b, authenticating the management domain access credentials received at block 410 using information in the management database 312b and, in the event those management domain access credentials are authenticated, determining a management domain that is associated with those management domain access credentials in the management database 312b, as well as performing any other management domain access credential operations that would be apparent to one of skill in the art in possession of the present disclosure. As such, continuing with the example provided above, at block 412 the management engine 312a in the management system 312 may access the management database 312b, authenticate the management domain access credentials received at block 410 using information in the management database 312b and, in response, determine that the secondary domain 600a and 600b is associated with those management domain access credentials in the management database 312b. Furthermore, one of skill in the art in possession of the present disclosure will appreciate how management access may be denied if the management domain access credentials received at block 410 are not authenticated at block 412.

Figure 8D:
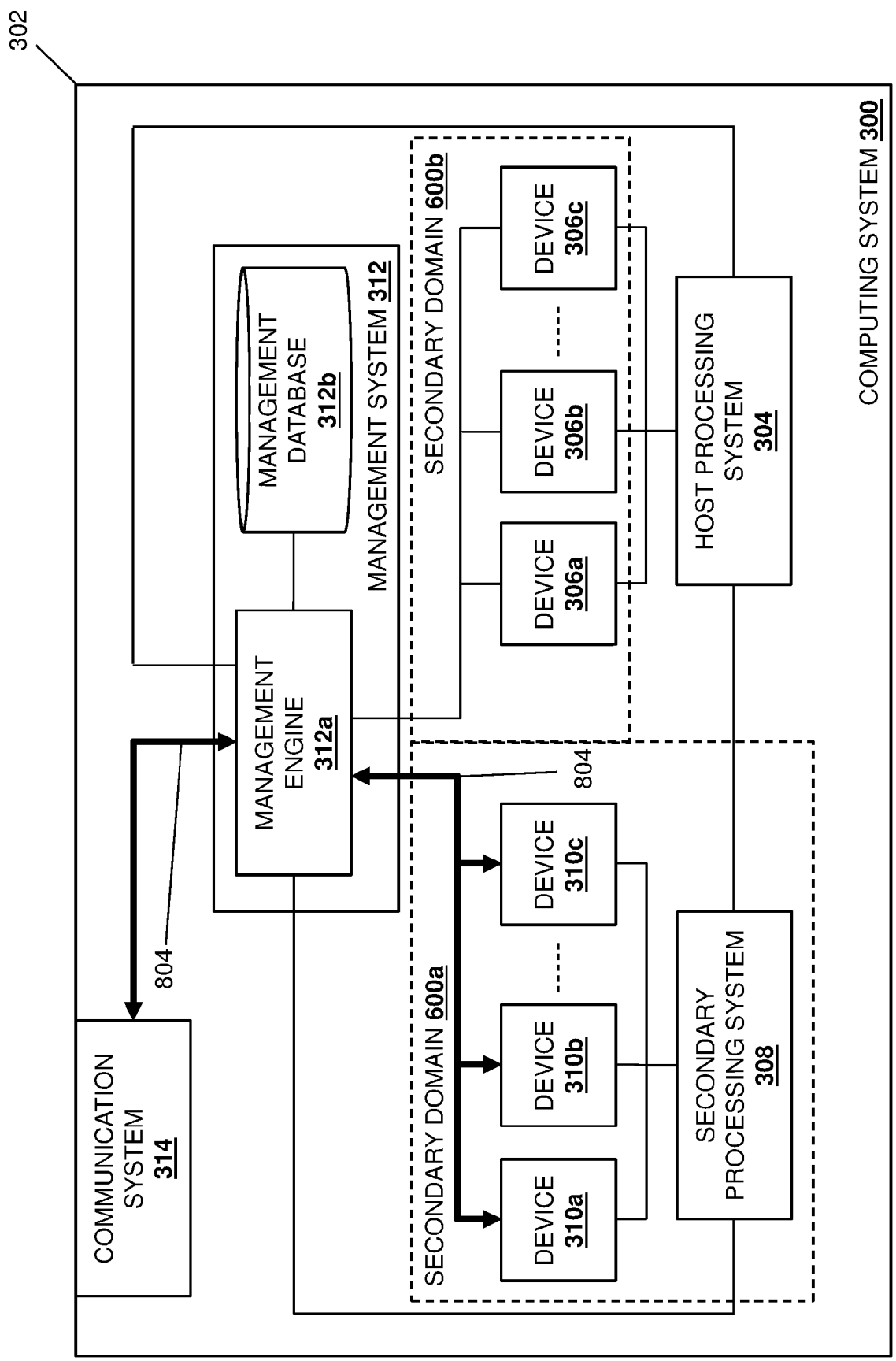
FIG. 8D is a schematic view illustrating an embodiment of the computing system of FIG. 3 operating during the method of FIG. 4.

The method 400 then proceeds to block 414 where the management system provides access to other devices connected to other processing system(s) associated with the other management domain. With reference to FIG. 8D, in an embodiment of block 414 and in response to determining at block 412 that the management domain access credentials received at block 410 have been authenticated and are associated with the secondary domain 600a and 600b, the management engine 312a in the management system 312 may provide the access associated with the secondary domain 600a and 600b to the devices 310a-310c that are connected to the secondary processing system 308 and the devices 306a-306c that are connected to the host processing system 304. As such, continuing with the example provided above, at block 414 the management engine 312a in the management system 312 may provide the management device 206 that transmitted the request for management access at block 410 the read/write access associated with the secondary domain 600a to the devices 310a-310c that are connected to the secondary processing system 308, and the read-only access associated with the secondary domain 600b to the devices 306a-306c that are connected to the host processing system 304.

Similarly as discussed above, in a specific example, the access associated with the secondary domain 600a and 600b and provided to the management device 206 that transmitted the request for management access at block 410 may allow that management device 206 to "see" the devices 306a-306c and 310a-310c, but may provide some indication that the devices 306a-306c are read-only devices (e.g., a management GUI provided on the management device 206 that has access to the secondary domain 600a and 600b may display icons or other indicators for the devices 306a-306c "greyed out" relative to the display of the indicators for the devices 310a-310c). However, while a specific example is provided, one of skill in the art in possession of the present disclosure will appreciate that the access associated with the secondary domain 600a and 600b may be provided in a variety of manners that will fall within the scope of the present disclosure as well.

Figure 8E:
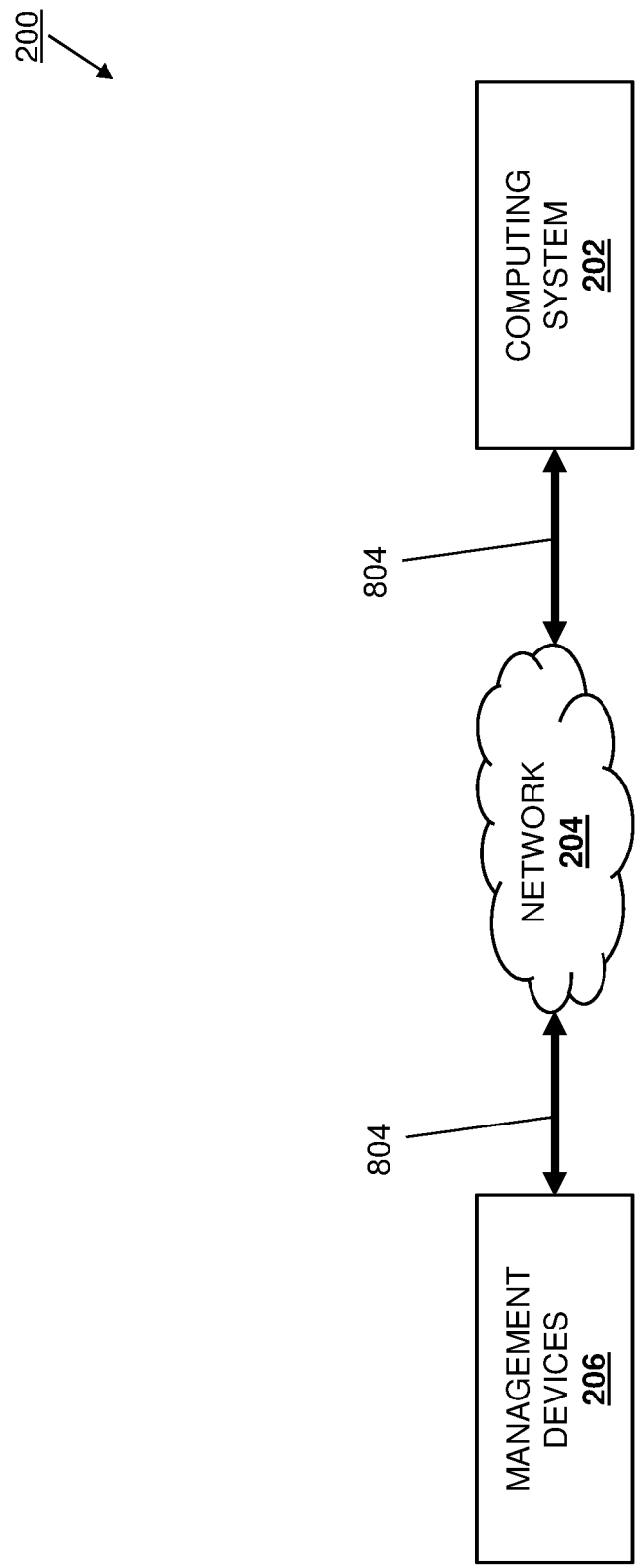
FIG. 8E is a schematic view illustrating an embodiment of the networked system of FIG. 2 operating during the method of FIG. 4.

Thus, as illustrated in FIGS. 8D and 8E, at block 414 the management device 206 that provided the request for management access at block 410 may perform management operations 804 that may include reading information from any of the devices 310a-310b via the network 204, the communication system 314 in the computing system 202/300, and the management system 312a (e.g., via the SMBus or other out-of-band management connection to the devices 310a-310c in the examples provided above), and/or writing information to any of the devices 310a-310b via the network 204, the communication system 314 in the computing system 202/300, and the management system 312a (e.g., via the SMBus or other out-of-band management connection to the devices 310a-310c in the examples provided above). As will be appreciated by one of skill in the art in possession of the present disclosure, read/write management operations 804 on the devices 310a-310c connected to the secondary processing system 308 may include performing firmware updates for the devices 306a-306c, assigning a device as a boot device for a logically composed subsystem provided on the host processing system 304 (which may include installation of an image on that device), and/or any other read/write management operations that would be apparent to one of skill in the art in possession of the present disclosure.

Figure 8F:
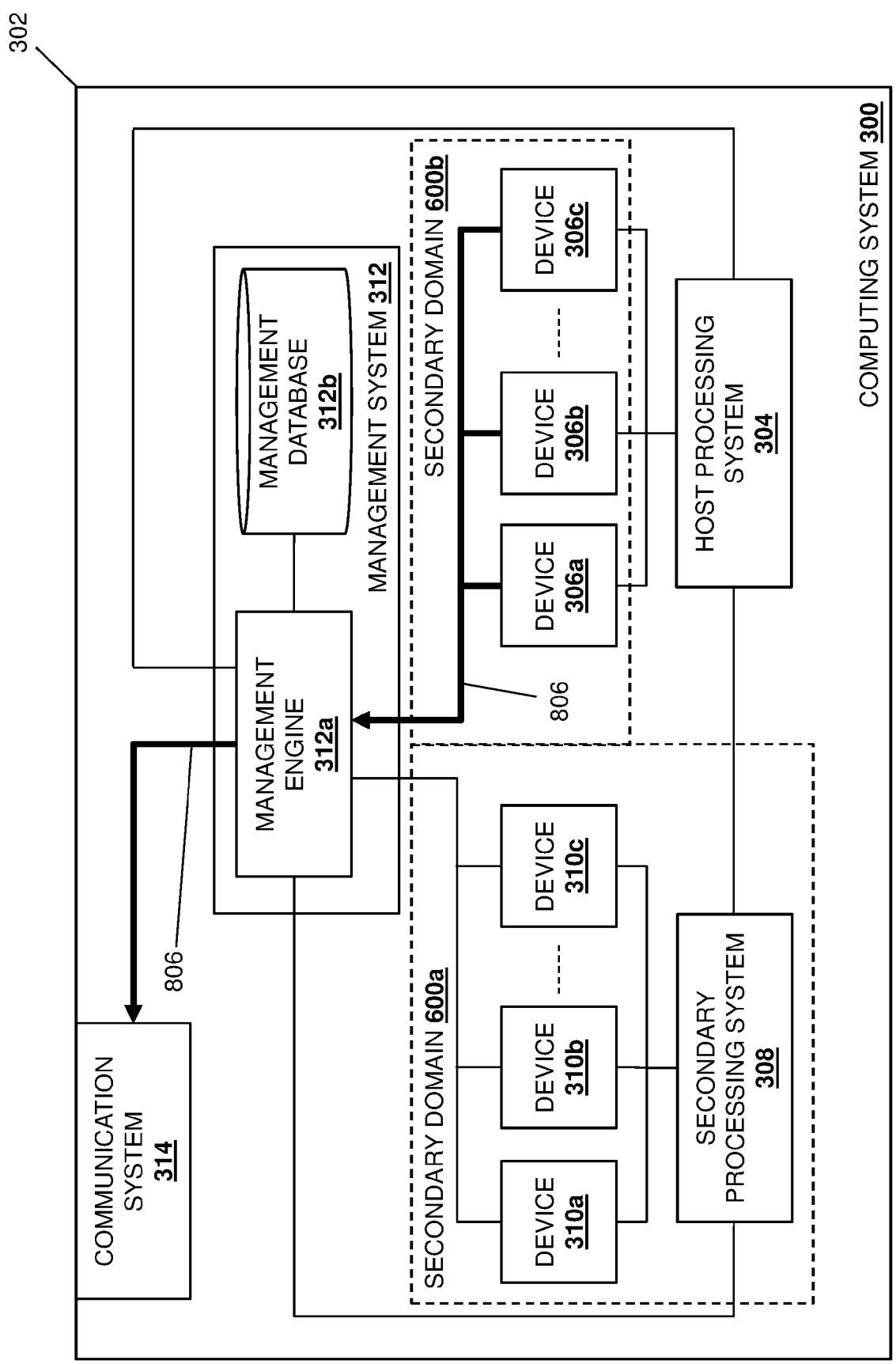
FIG. 8F is a schematic view illustrating an embodiment of the computing system of FIG. 3 operating during the method of FIG. 4.

Similarly, as illustrated in FIGS. 8F and 8G, at block 414 the management device 206 that provided the request for management access at block 410 may perform management operations 806 that may include reading information from any of the devices 306a-306b via the network 204, the communication system 314 in the computing system 202/300, and the management system 312a (e.g., via the SMBus or other out-of-band management connection to the devices 306a-306c in the examples provided above). As will be appreciated by one of skill in the art in possession of the present disclosure, read-only management operations 806 on the devices 306a-306c connected to the host processing system 304 may include recording of an inventory of resources available to logically composed systems running on the host processing system, and/or any other read-only management operations that would be apparent to one of skill in the art in possession of the present disclosure. The method 400 may then return to block 410. As such, the method 400 may loop to provide management access associated with any particular management domain, and thus the device(s) connected to the processing system(s) associated with that management domain, as long as management domain access credentials associated with that management domain are provided.

Figure 9A:
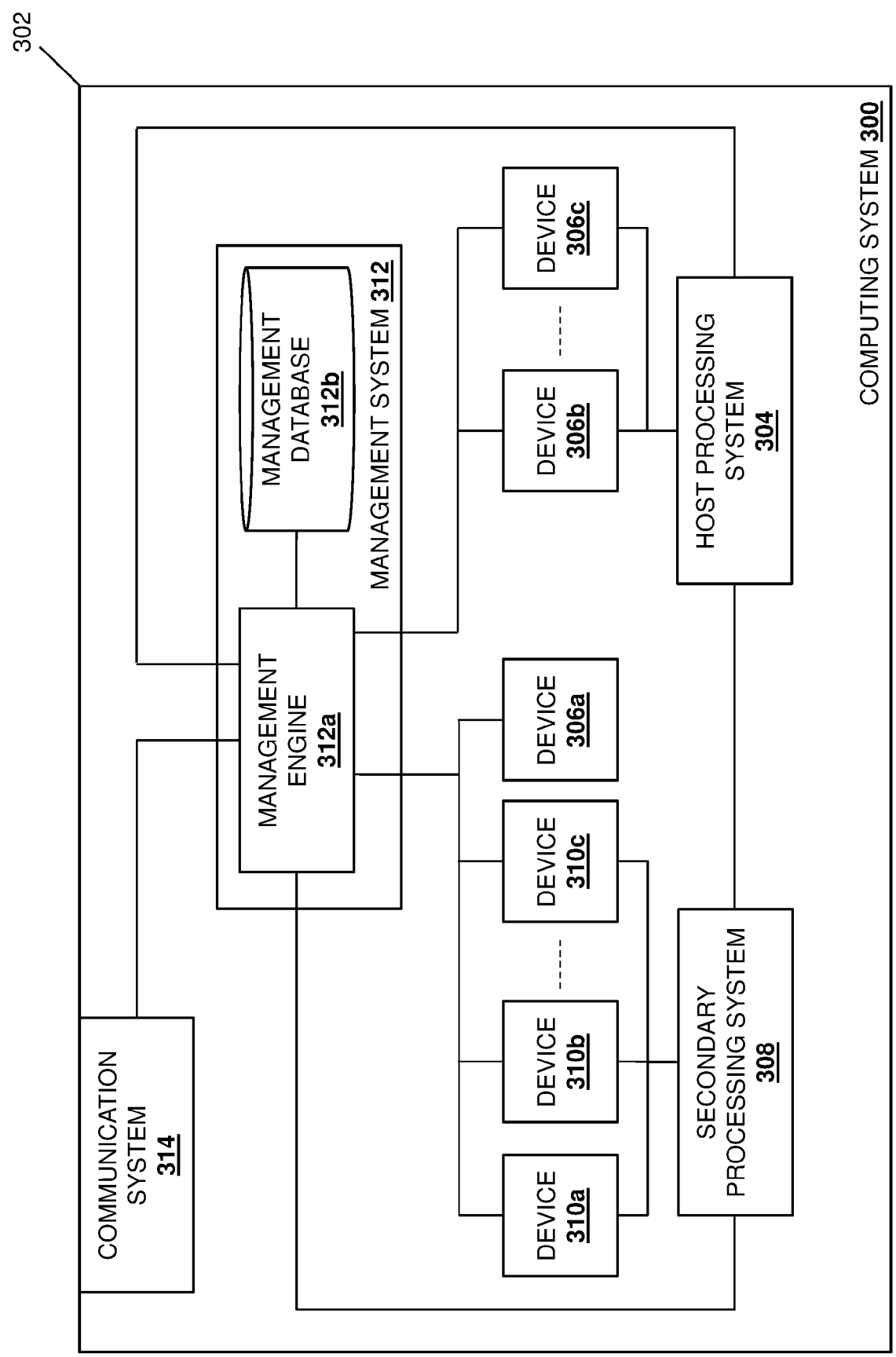
FIG. 9A is a schematic view illustrating an embodiment of the computing system of FIG. 3 operating during the method of FIG. 4.
Figure 9B:
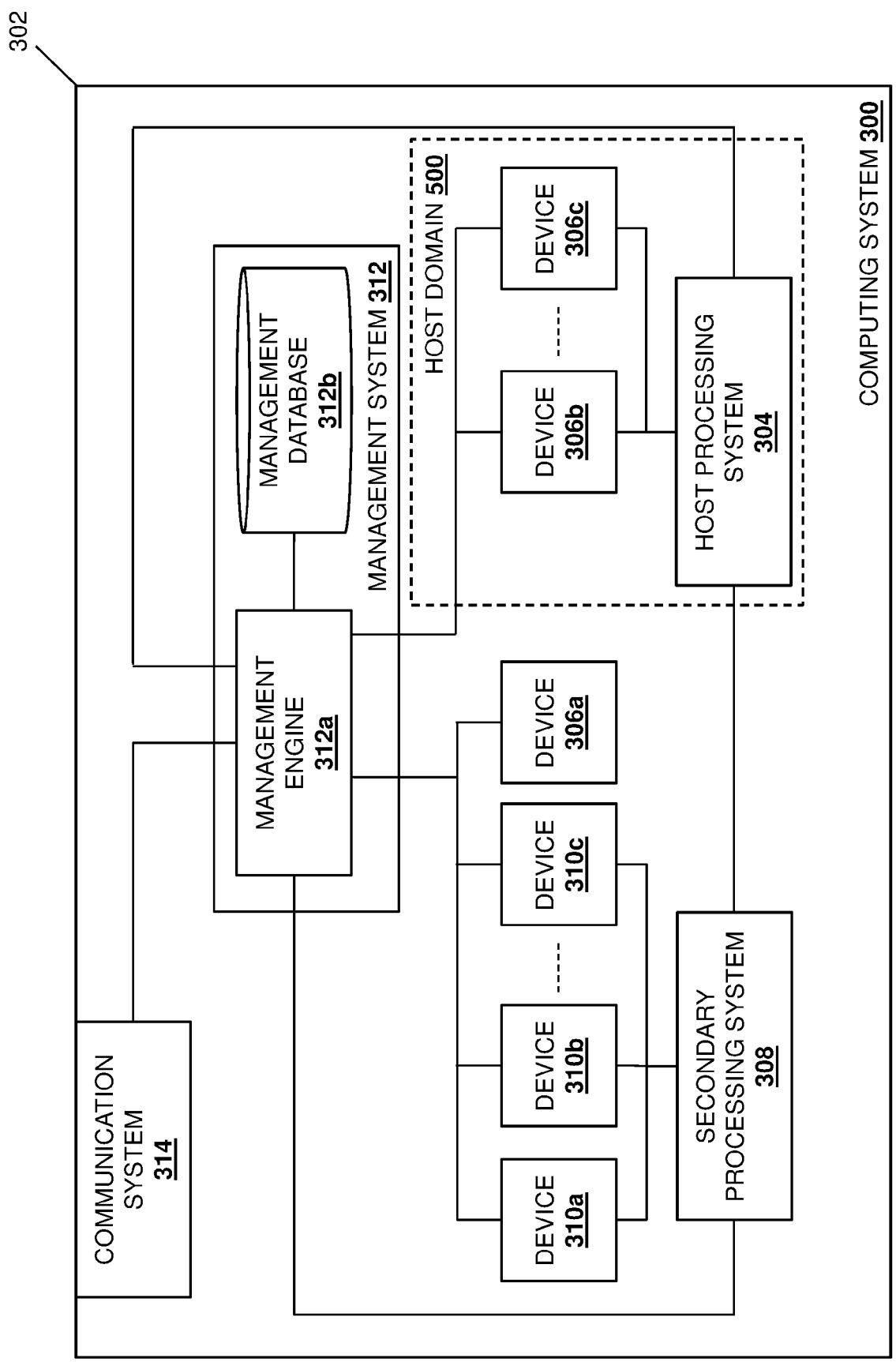
FIG. 9B is a schematic view illustrating an embodiment of the computing system of FIG. 3 operating during the method of FIG. 4.
Figure 9C:
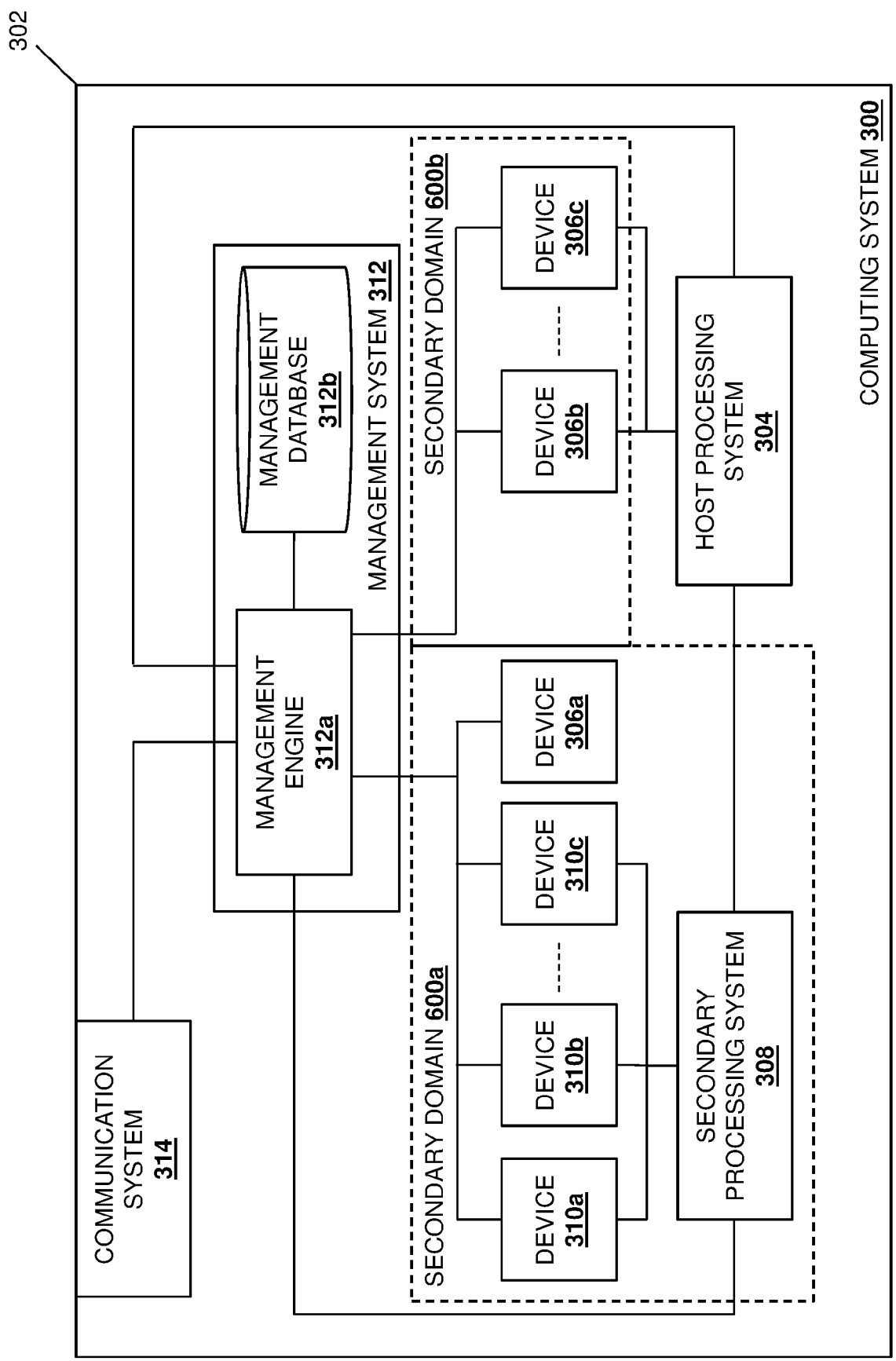
FIG. 9C is a schematic view illustrating an embodiment of the computing system of FIG. 3 operating during the method of FIG. 4.

Referring now to FIGS. 9A, 9B, and 9C, an example of specific functionality associated with the intra-chassis multi-management domain system of the present disclosure is illustrated. For example, FIG. 9A illustrates how the device 306a that was connected to the host processing system 304 (as illustrated in FIG. 3) may have been disconnected from the host processing system 304 and connected to the secondary processing system 308. As illustrated in FIGS. 9A and 9B, using the examples above and subsequent to the disconnection of the device 306a from the host processing system 304 and its connection to the secondary processing system 308, the host domain 500 associated with the host processing system 304 is configured to provide read/write access to the devices 306b and 306c connected to the host processing system 304, and the secondary domain 600a and 600b associated with the secondary processing system 308 is configured to provide read/write access to the devices 310a-310c and 306a connected to the secondary processing system 308 and read-only access to the devices 306b and 306c connected to the host processing system 304. As such, the intra-chassis device multi-management domain system of the present disclosure allows multiple management domains to restrict access to devices connected to different processing systems in the same chassis based on their connection to those different processing systems, thus allowing those processing systems/devices to be managed separately (e.g., via different management domain access credentials as discussed above).

Thus, systems and methods have been described that provide different management domains for a CPU and SCP in a server, which may be utilized to restrict access to devices connected to the CPU and devices connected to the SCP based on the management domain access credentials provided for management access. For example, the intra-chassis device multi-management domain system of the present disclosure may include a server having a CPU connected to first device(s), an SCP connected to second device(s), and a management system connected to the first and second device(s). The management system may receive a first request for management access including first management domain access credentials, determine that the first management domain access credentials allow first access to a CPU domain associated with the CPU and, in response, provide read/write access to the first device(s) connected to the CPU. The management system may also receive a second request for management access that includes second management domain access credentials, determine that the second management domain access credentials allow second access to an SPU domain associated with the SCP and, in response, provide the read/write access to the second device(s) connected to the SCP and read-only access to the first device(s) connected to the CPU. As such, changes may only be made to devices connected to the CPU or SPU in the server if management domain access credentials are provided that allow access to its management domain.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An intra-chassis device multi-management domain system, comprising:
 a chassis;
 a host processing system that is housed in the chassis;
 a secondary processing system that is housed in the chassis;
 at least one first device that is housed in the chassis and that is connected to the host processing system;
 at least one second device that is housed in the chassis and that is connected to the secondary processing system; and
 a management system that is housed in the chassis and connected to the at least one first device and the at least one second device, wherein the management system is configured to:
  receive a first request for management access that includes first management domain access credentials;
  determine that the first management domain access credentials allow first access to a host domain associated with the host processing system and, in response, provide the first access to the at least one first device connected to the host processing system;
  receive a second request for management access that includes second management domain access credentials; and
  determine that the second management domain access credentials allow second access to a secondary domain associated with the secondary processing system and, in response, provide the second access to the at least one second device connected to the secondary processing system.

2. The system of claim 1, wherein the first access to the at least one first device connected to the host processing system is read/write access, and wherein the second access to the at least one second device connected to the secondary processing system is read/write access.

3. The system of claim 1, wherein the management system is configured to:
 determine that the second management domain access credentials allow third access to the host domain associated with the host processing system and, in response, provide the third access to the at least one first device connected to the host processing system.

4. The system of claim 3, wherein the second access to the at least one second device connected to the secondary processing system is read/write access, and wherein the third access to the at least one first device connected to the host processing system is read-only access.

5. The system of claim 1, wherein the first access is provided to the at least one first device without the use of the host processing system, and wherein the second access is provided to the at least one second device without the use of the secondary processing system.

6. The system of claim 1, wherein the management system is connected to the at least one first device and the at least one second device by at least one out-of-band connection.

7. An Information Handling System (IHS), comprising:
 a management processing system; and
 a management memory system that is coupled to the management processing system and that includes instructions that, when executed by the management processing system, cause the management processing system to provide a management engine that is configured to:
  receive a first request for management access that includes first management domain access credentials;
  determine that the first management domain access credentials allow first access to a host domain associated with a host processing system and, in response, provide the first access to at least one first device that is connected to the management processing system and the host processing system;
  receive a second request for management access that includes second management domain access credentials; and
  determine that the second management domain access credentials allow second access to a secondary domain associated with a secondary processing system and, in response, provide the second access to the at least one second device that is connected to the management processing system and the secondary processing system.

8. The IHS of claim 7, wherein the first access to the at least one first device connected to the management processing system and the host processing system is read/write access, and wherein the second access to the at least one second device connected to the management processing system and the secondary processing system is read/write access.

9. The IHS of claim 7, wherein the management system is configured to:
   determine that the second management domain access credentials allow third access to the host domain associated with the host processing system and, in response, provide the third access to the at least one first device connected to the management processing system and the host processing system.

10. The IHS of claim 9, wherein the second access to the at least one second device connected to the management processing system and the secondary processing system is read/write access, and wherein the third access to the at least one first device connected to the management processing system and the host processing system is read-only access.

11. The IHS of claim 7, wherein the first access is provided to the at least one first device without the use of the host processing system, and wherein the second access is provided to the at least one second device without the use of the secondary processing system.

12. The IHS of claim 7, wherein the management processing system is connected to the at least one first device and the at least one second device by at least one out-of-band connection.

13. The IHS of claim 7, wherein the management engine is configured to:
   perform, via the first access provided in response to determining that the first management domain access credentials allow the first access to the host domain associated with the host processing system, at least one first management operation on the at least one first device; and
   perform, via the second access provided in response to determining that the second management domain access credentials allow the second access to the secondary domain associated with the secondary processing system, at least one second management operation on the at least one second device.

14. A method for managing devices in a chassis via multiple management domains, comprising:
   receiving, by a management system, a first request for management access that includes first management domain access credentials;
   determining, by the management system, that the first management domain access credentials allow first access to a host domain associated with a host processing system and, in response, providing the first access to at least one first device that is connected to the management processing system and the host processing system;
   receiving, by the management system, a second request for management access that includes second management domain access credentials; and
   determining, by the management system, that the second management domain access credentials allow second access to a secondary domain associated with a secondary processing system and, in response, providing the second access to the at least one second device that is connected to the management processing system and the secondary processing system.

15. The method of claim 14, wherein the first access to the at least one first device connected to the management processing system and the host processing system is read/write access, and wherein the second access to the at least one second device connected to the management processing system and the secondary processing system is read/write access.

16. The method of claim 14, further comprising:
   determining, by the management system, that the second management domain access credentials allow third access to the host domain associated with the host processing system and, in response, providing the third access to the at least one first device connected to the management processing system and the host processing system.

17. The method of claim 16, wherein the second access to the at least one second device connected to the management processing system and the secondary processing system is read/write access, and wherein the third access to the at least one first device connected to the management processing system and the host processing system is read-only access.

18. The method of claim 14, wherein the first access is provided to the at least one first device without the use of the host processing system, and wherein the second access is provided to the at least one second device without the use of the secondary processing system.

19. The method of claim 14, wherein the management processing system is connected to the at least one first device and the at least one second device by at least one out-of-band connection.

20. The method of claim 14, further comprising:
   performing, by the management device via the first access provided in response to determining that the first management domain access credentials allow the first access to the host domain associated with the host processing system, at least one first management operation on the at least one first device; and
   performing, by the management device via the second access provided in response to determining that the second management domain access credentials allow the second access to the secondary domain associated with the secondary processing system, at least one second management operation on the at least one second device.

* * * * *